United States Patent
Rios et al.

(10) Patent No.: US 10,290,231 B2
(45) Date of Patent: *May 14, 2019

(54) AUTOMATED DETECTION OF PERFORMANCE CHARACTERISTICS IN AN INJECTION TRAINING SYSTEM

(71) Applicant: TruInject Medical Corp., Irvine, CA (US)

(72) Inventors: Gabrielle A. Rios, Irvine, CA (US); David J. Mishelevich, Playa del Rey, CA (US); Clark B. Foster, Mission Viejo, CA (US)

(73) Assignee: TruInject Corp., Irvine, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/645,997

(22) Filed: Mar. 12, 2015

(65) Prior Publication Data

US 2015/0262512 A1 Sep. 17, 2015

Related U.S. Application Data

(60) Provisional application No. 61/952,579, filed on Mar. 13, 2014.

(51) Int. Cl.
*G09B 23/28* (2006.01)
*G09B 23/30* (2006.01)

(52) U.S. Cl.
CPC ........... *G09B 23/285* (2013.01); *G09B 23/28* (2013.01); *G09B 23/30* (2013.01)

(58) Field of Classification Search
CPC ...... G09B 23/285; G09B 23/30; G09B 23/32; G09B 23/28
See application file for complete search history.

(56) References Cited

U.S. PATENT DOCUMENTS

| | | |
|---|---|---|
| 3,237,340 A | 3/1966 | Knott |
| 3,941,121 A | 3/1976 | Olinger et al. |

(Continued)

FOREIGN PATENT DOCUMENTS

| | | |
|---|---|---|
| AU | 2011218649 B2 | 9/2011 |
| AU | 2015255197 A1 | 12/2015 |

(Continued)

OTHER PUBLICATIONS

PCT International Search Report and Written Opinion of the International Searching Authority, dated Apr. 29, 2015, issued in International Application No. PCT/US2015/011845, in the Application of Truinject Medical Corp.

(Continued)

*Primary Examiner* — Samchuan C Yao
*Assistant Examiner* — Lily M Del Valle
(74) *Attorney, Agent, or Firm* — Knobbe, Martens, Olson & Bear, LLP

(57) ABSTRACT

Various systems and methods are provided for injection training by collecting, processing, analyzing and displaying measured information associated with the delivery of an injection. Sensor-based measurements of a syringe's position and orientation in three-dimensional space are obtained and processed to provide metrics of a trainee's injection performance. The measurements can be combined with a digital model of a training apparatus to deliver a computer-generated, graphical depiction of the training injection, enabling visualization of the injection from perspectives unavailable in the physical world. The training injection execution, as reflected in the measured sensor-based data, can be reviewed and analyzed at times after, and in locations different than, the time and location of the training injection. Additionally, injection training data associated with multiple (Continued)

training injections can be aggregated and analyzed for, among other things, trends in performance.

24 Claims, 18 Drawing Sheets

(56) References Cited

U.S. PATENT DOCUMENTS

| | | | |
|---|---|---|---|
| 4,142,517 | A | 3/1979 | Contreras Guerrero de Stavropoulos et al. |
| 4,311,138 | A | 1/1982 | Sugarman |
| 4,356,828 | A | 11/1982 | Jamshidi |
| 4,410,020 | A | 10/1983 | Lorenz |
| 4,515,168 | A | 5/1985 | Chester et al. |
| 4,566,438 | A | 1/1986 | Liese et al. |
| 4,836,632 | A | 6/1989 | Bardoorian |
| 4,880,971 | A | 11/1989 | Danisch |
| 5,197,476 | A | 3/1993 | Nowacki et al. |
| 5,198,877 | A | 3/1993 | Schulz |
| 5,241,184 | A | 8/1993 | Menzel |
| 5,249,581 | A | 10/1993 | Horbal et al. |
| 5,295,483 | A | 3/1994 | Nowacki et al. |
| 5,321,257 | A | 6/1994 | Danisch |
| 5,391,081 | A | 2/1995 | Lampotang et al. |
| 5,518,407 | A | 5/1996 | Greenfield et al. |
| 5,622,170 | A | 4/1997 | Shulz |
| 5,651,783 | A | 7/1997 | Reynard |
| 5,727,948 | A | 3/1998 | Jordan |
| 5,817,105 | A | 10/1998 | Van Der Brug |
| 5,828,770 | A | 10/1998 | Leis et al. |
| 5,890,908 | A | 4/1999 | Lampotang et al. |
| 5,899,692 | A | 5/1999 | Davis et al. |
| 5,923,417 | A | 7/1999 | Leis |
| 5,954,648 | A | 9/1999 | Van Der Brug |
| 5,954,701 | A | 9/1999 | Matalon |
| 6,024,576 | A | 2/2000 | Bevirt et al. |
| 6,061,644 | A | 5/2000 | Leis |
| 6,064,749 | A | 5/2000 | Hirota et al. |
| 6,127,672 | A | 10/2000 | Danisch |
| 6,217,558 | B1 | 4/2001 | Zadini et al. |
| 6,288,785 | B1 | 9/2001 | Frantz et al. |
| 6,353,226 | B1 | 3/2002 | Khalil et al. |
| 6,385,482 | B1 | 5/2002 | Boksberger et al. |
| 6,485,308 | B1 | 11/2002 | Goldstein |
| 6,553,326 | B1 | 4/2003 | Kirsch et al. |
| 6,564,087 | B1 | 5/2003 | Pitris et al. |
| 6,575,757 | B1 | 6/2003 | Leight et al. |
| 6,625,563 | B2 | 9/2003 | Kirsch et al. |
| 6,702,790 | B1 | 3/2004 | Ross et al. |
| 6,769,286 | B2 | 8/2004 | Biermann et al. |
| 6,774,624 | B2 | 8/2004 | Anderson et al. |
| 6,836,745 | B2 | 12/2004 | Seiler et al. |
| 6,863,536 | B1 | 3/2005 | Fisher et al. |
| 7,015,859 | B2 | 3/2006 | Anderson |
| 7,137,712 | B2 | 11/2006 | Brunner et al. |
| 7,158,754 | B2 | 1/2007 | Anderson |
| 7,194,296 | B2 | 3/2007 | Frantz et al. |
| 7,204,796 | B1 | 4/2007 | Seiler |
| 7,247,149 | B2 | 7/2007 | Beyerlein |
| 7,383,728 | B2 | 6/2008 | Noble et al. |
| 7,500,853 | B2 | 3/2009 | Bevirt et al. |
| 7,553,159 | B1 | 6/2009 | Arnal et al. |
| 7,594,815 | B2 | 9/2009 | Toly |
| 7,665,995 | B2 | 2/2010 | Toly |
| 7,725,279 | B2 | 5/2010 | Luinge et al. |
| 7,761,139 | B2 | 7/2010 | Tearney et al. |
| 7,783,441 | B2 | 8/2010 | Nieminen et al. |
| 7,857,626 | B2 | 12/2010 | Toly |
| 7,912,662 | B2 | 3/2011 | Zuhars et al. |
| 7,945,311 | B2 | 5/2011 | McCloy et al. |
| 8,007,281 | B2 | 8/2011 | Toly |
| 8,040,127 | B2 | 10/2011 | Jensen |
| 8,072,606 | B2 | 12/2011 | Chau et al. |
| 8,131,342 | B2 | 3/2012 | Anderson |
| 8,165,844 | B2 | 4/2012 | Luinge et al. |
| 8,203,487 | B2 | 6/2012 | Hol et al. |
| 8,208,716 | B2 | 6/2012 | Choi et al. |
| 8,226,610 | B2 | 7/2012 | Edwards et al. |
| 8,250,921 | B2 | 8/2012 | Nasiri et al. |
| 8,257,250 | B2 | 9/2012 | Tenger et al. |
| 8,277,411 | B2 | 10/2012 | Gellman |
| 8,319,182 | B1 | 11/2012 | Brady et al. |
| 8,342,853 | B2 | 1/2013 | Cohen |
| 8,351,773 | B2 | 1/2013 | Nasiri et al. |
| 8,382,485 | B2 | 2/2013 | Bardsley |
| 8,403,888 | B2 | 3/2013 | Gaudet |
| 8,408,918 | B2 | 4/2013 | Hu et al. |
| 8,409,140 | B2 | 4/2013 | Ejlersen et al. |
| 8,437,833 | B2 | 5/2013 | Silverstein |
| 8,442,619 | B2 | 5/2013 | Li et al. |
| 8,450,997 | B2 | 5/2013 | Silverman |
| 8,467,855 | B2 | 6/2013 | Yasui |
| 8,525,990 | B2 | 9/2013 | Wilcken |
| 8,535,062 | B2 | 9/2013 | Nguyen |
| 8,556,635 | B2 | 10/2013 | Toly |
| 8,632,498 | B2 | 1/2014 | Rimsa et al. |
| 8,655,622 | B2 | 2/2014 | Yen et al. |
| 8,689,801 | B2 | 4/2014 | Ritchey et al. |
| 8,764,449 | B2 | 7/2014 | Rios et al. |
| 8,818,751 | B2 | 8/2014 | Van Acht et al. |
| 8,917,916 | B2 | 12/2014 | Martin et al. |
| 8,945,147 | B2 | 2/2015 | Ritchey et al. |
| 8,961,189 | B2 | 2/2015 | Rios et al. |
| 8,994,366 | B2 | 3/2015 | Ashe |
| 9,017,080 | B1 | 4/2015 | Placik |
| 9,024,624 | B2 | 5/2015 | Brunner |
| 9,031,314 | B2 | 5/2015 | Clausen et al. |
| 9,251,721 | B2 | 2/2016 | Lampotang et al. |
| 9,439,653 | B2 | 9/2016 | Avneri et al. |
| 9,443,446 | B2 | 9/2016 | Rios et al. |
| 9,456,766 | B2 | 10/2016 | Cox et al. |
| 9,460,638 | B2 | 10/2016 | Baker et al. |
| 9,486,162 | B2 | 11/2016 | Zhuang et al. |
| 9,626,805 | B2 | 4/2017 | Lampotang et al. |
| 9,792,836 | B2 | 10/2017 | Rios et al. |
| 9,922,578 | B2 | 3/2018 | Foster et al. |
| 2002/0168618 | A1 | 11/2002 | Anderson et al. |
| 2003/0031993 | A1* | 2/2003 | Pugh .................... G09B 23/30 434/262 |
| 2003/0055380 | A1 | 3/2003 | Flaherty |
| 2003/0108853 | A1 | 6/2003 | Chosack et al. |
| 2003/0114842 | A1 | 6/2003 | DiStefano |
| 2004/0009459 | A1 | 1/2004 | Anderson et al. |
| 2004/0092878 | A1 | 5/2004 | Flaherty |
| 2004/0118225 | A1 | 6/2004 | Wright |
| 2004/0175684 | A1 | 9/2004 | Kaasa et al. |
| 2005/0055241 | A1 | 3/2005 | Horstmann |
| 2005/0057243 | A1 | 3/2005 | Johnson et al. |
| 2005/0084833 | A1 | 4/2005 | Lacey et al. |
| 2005/0181342 | A1* | 8/2005 | Toly ...................... G09B 23/30 434/262 |
| 2006/0084050 | A1 | 4/2006 | Haluck |
| 2006/0194180 | A1 | 8/2006 | Bevirt et al. |
| 2006/0264745 | A1 | 11/2006 | Da Silva |
| 2007/0003917 | A1 | 1/2007 | Kitching et al. |
| 2007/0197954 | A1 | 8/2007 | Keenan |
| 2007/0238981 | A1 | 10/2007 | Zhu |
| 2008/0097378 | A1 | 4/2008 | Zuckerman |
| 2008/0107305 | A1 | 5/2008 | Vanderkooy et al. |
| 2008/0138781 | A1 | 6/2008 | Pellegrin et al. |
| 2008/0176198 | A1 | 7/2008 | Ansari et al. |
| 2009/0046140 | A1 | 2/2009 | Lashmet |
| 2009/0061404 | A1 | 3/2009 | Toly |
| 2009/0081619 | A1 | 3/2009 | Miasnik |
| 2009/0081627 | A1 | 3/2009 | Ambrozio |
| 2009/0123896 | A1 | 5/2009 | Hu et al. |
| 2009/0142741 | A1 | 6/2009 | Ault et al. |
| 2009/0208915 | A1 | 8/2009 | Pugh |
| 2009/0263775 | A1 | 10/2009 | Ullrich |
| 2009/0265671 | A1 | 10/2009 | Sachs et al. |
| 2009/0278791 | A1 | 11/2009 | Slycke et al. |
| 2009/0305213 | A1 | 12/2009 | Burgkart et al. |
| 2009/0326556 | A1 | 12/2009 | Diolaiti |
| 2010/0030111 | A1 | 2/2010 | Perriere |

(56) References Cited

U.S. PATENT DOCUMENTS

| | | |
|---|---|---|
| 2010/0071467 A1 | 3/2010 | Nasiri et al. |
| 2010/0099066 A1 | 4/2010 | Mire et al. |
| 2010/0120006 A1 | 5/2010 | Bell |
| 2010/0167249 A1 | 7/2010 | Ryan |
| 2010/0167254 A1 | 7/2010 | Nguyen |
| 2010/0179428 A1 | 7/2010 | Pederson et al. |
| 2010/0198141 A1 | 8/2010 | Laitenberger et al. |
| 2010/0273135 A1 | 10/2010 | Cohen |
| 2011/0027767 A1 | 2/2011 | Divinagracia |
| 2011/0046915 A1 | 2/2011 | Hol et al. |
| 2011/0071419 A1 | 3/2011 | Liu et al. |
| 2011/0202012 A1* | 8/2011 | Bartlett ............... A61M 5/3287 604/218 |
| 2011/0207102 A1 | 8/2011 | Trotta et al. |
| 2011/0236866 A1 | 9/2011 | Psaltis et al. |
| 2011/0257596 A1 | 10/2011 | Gaudet |
| 2011/0269109 A2 | 11/2011 | Miyazaki |
| 2011/0294103 A1 | 12/2011 | Segal et al. |
| 2011/0301500 A1 | 12/2011 | Maguire et al. |
| 2012/0015336 A1 | 1/2012 | Mach |
| 2012/0026307 A1 | 2/2012 | Price |
| 2012/0034587 A1 | 2/2012 | Toly |
| 2012/0130269 A1 | 5/2012 | Rea |
| 2012/0148994 A1 | 6/2012 | Hori et al. |
| 2012/0171652 A1 | 7/2012 | Sparks et al. |
| 2012/0214144 A1 | 8/2012 | Trotta et al. |
| 2012/0219937 A1 | 8/2012 | Hughes |
| 2012/0238875 A1 | 9/2012 | Savitsky et al. |
| 2012/0251987 A1 | 10/2012 | Huang et al. |
| 2012/0280988 A1 | 11/2012 | Lampotang et al. |
| 2012/0282583 A1 | 11/2012 | Thaler et al. |
| 2012/0301858 A1 | 11/2012 | Park et al. |
| 2012/0323520 A1 | 12/2012 | Keal |
| 2013/0018494 A1 | 1/2013 | Amini |
| 2013/0046489 A1 | 2/2013 | Keal |
| 2013/0100256 A1 | 4/2013 | Kirk et al. |
| 2013/0131503 A1 | 5/2013 | Schneider et al. |
| 2013/0179110 A1 | 7/2013 | Lee |
| 2013/0189658 A1 | 7/2013 | Peters et al. |
| 2013/0197845 A1 | 8/2013 | Keal |
| 2013/0198625 A1 | 8/2013 | Anderson |
| 2013/0203032 A1 | 8/2013 | Bardsley |
| 2013/0236872 A1 | 9/2013 | Laurusonis et al. |
| 2013/0267838 A1 | 10/2013 | Fronk et al. |
| 2013/0296691 A1 | 11/2013 | Ashe |
| 2013/0323700 A1* | 12/2013 | Samosky ............... G09B 23/28 434/262 |
| 2014/0102167 A1 | 4/2014 | MacNeil et al. |
| 2014/0120505 A1 | 5/2014 | Rios et al. |
| 2014/0121636 A1 | 5/2014 | Boyden |
| 2014/0162232 A1 | 6/2014 | Yang et al. |
| 2014/0212864 A1 | 7/2014 | Rios et al. |
| 2014/0240314 A1* | 8/2014 | Fukazawa ............ G06T 11/206 345/419 |
| 2014/0244209 A1 | 8/2014 | Lee et al. |
| 2014/0260704 A1 | 9/2014 | Lloyd et al. |
| 2014/0278183 A1 | 9/2014 | Zheng et al. |
| 2014/0278205 A1 | 9/2014 | Bhat et al. |
| 2014/0278215 A1 | 9/2014 | Keal et al. |
| 2014/0349266 A1 | 11/2014 | Choi |
| 2015/0079545 A1* | 3/2015 | Kurtz ..................... G06F 21/32 434/30 |
| 2015/0182706 A1 | 7/2015 | Wurmbauer et al. |
| 2015/0206456 A1 | 7/2015 | Foster et al. |
| 2015/0352294 A1* | 12/2015 | O'Mahony ......... A61M 5/1452 604/506 |
| 2015/0379899 A1 | 12/2015 | Baker et al. |
| 2015/0379900 A1 | 12/2015 | Samosky et al. |
| 2016/0000411 A1 | 1/2016 | Raju et al. |
| 2016/0001016 A1 | 1/2016 | Poulsen et al. |
| 2016/0155363 A1 | 6/2016 | Rios et al. |
| 2016/0193428 A1 | 7/2016 | Perthu |
| 2016/0213856 A1 | 7/2016 | Despa et al. |
| 2016/0293058 A1 | 10/2016 | Gaillot et al. |
| 2017/0136185 A1 | 5/2017 | Rios et al. |
| 2017/0178540 A1 | 6/2017 | Rios et al. |
| 2017/0186339 A1 | 6/2017 | Rios et al. |
| 2017/0245943 A1 | 8/2017 | Foster et al. |
| 2017/0252108 A1 | 9/2017 | Rios et al. |
| 2017/0254636 A1 | 9/2017 | Foster et al. |
| 2018/0012516 A1 | 1/2018 | Rios et al. |
| 2018/0197441 A1 | 7/2018 | Rios et al. |
| 2018/0211562 A1 | 7/2018 | Rios et al. |
| 2018/0240365 A1 | 8/2018 | Foster et al. |
| 2018/0261125 A1 | 9/2018 | Rios et al. |
| 2018/0261126 A1 | 9/2018 | Rios et al. |

FOREIGN PATENT DOCUMENTS

| | | |
|---|---|---|
| CA | 2865236 A1 | 9/2013 |
| CN | 2751386 Y | 1/2006 |
| CN | 201213049 Y | 3/2009 |
| CN | 102708745 A | 10/2012 |
| CN | 104703641 A | 6/2015 |
| CN | 105118350 A | 12/2015 |
| CN | 205541594 U | 8/2016 |
| CN | 106710413 A | 5/2017 |
| CN | 107067856 A | 8/2017 |
| DE | 202005021286 U1 | 9/2007 |
| EP | 0316763 A1 | 5/1989 |
| EP | 1 504 713 A1 | 2/2005 |
| EP | 1723977 A1 | 11/2006 |
| EP | 1884211 A2 | 2/2008 |
| EP | 2 538 398 A1 | 12/2012 |
| EP | 2425416 B1 | 3/2015 |
| EP | 2756857 B1 | 5/2016 |
| GB | 2288686 B | 7/1997 |
| GB | 2309644 A | 8/1997 |
| GB | 2508510 | 6/2014 |
| IN | 201202900 P1 | 11/2013 |
| JP | 2013-037088 A | 2/2013 |
| JP | 52-21420 | 6/2013 |
| JP | 2013-250453 A | 12/2013 |
| JP | 2014-153482 A | 8/2014 |
| KR | 2012009379 A | 2/2012 |
| KR | 20140047943 A | 4/2014 |
| TW | 201207785 A | 2/2012 |
| WO | WO 00/53115 | 9/2000 |
| WO | WO 02/083003 A1 | 10/2002 |
| WO | WO 2005/083653 | 9/2005 |
| WO | WO 2007/109540 A2 | 9/2007 |
| WO | WO 2008/005315 A2 | 1/2008 |
| WO | WO 2008/122006 A1 | 10/2008 |
| WO | WO 2009/023247 A1 | 2/2009 |
| WO | WO 2009/049282 | 4/2009 |
| WO | WO 2009/094646 A2 | 7/2009 |
| WO | WO 2009/141769 | 11/2009 |
| WO | WO 2011/043645 | 4/2011 |
| WO | WO 2011/127379 A2 | 10/2011 |
| WO | WO 2011/136778 | 11/2011 |
| WO | WO 2012/075166 | 6/2012 |
| WO | WO 2012/088471 A1 | 6/2012 |
| WO | WO 2012/101286 | 8/2012 |
| WO | WO 2012/106706 | 8/2012 |
| WO | WO 2012/155056 | 11/2012 |
| WO | WO 2013/025639 | 2/2013 |
| WO | WO 2013/064804 A1 | 5/2013 |
| WO | WO 2014/070799 | 5/2014 |
| WO | WO 2014/100658 | 6/2014 |
| WO | WO 2015/109251 | 7/2015 |
| WO | WO 2015/110327 A1 | 7/2015 |
| WO | WO 2015/136564 | 9/2015 |
| WO | WO 2015/138608 | 9/2015 |
| WO | WO 2015/171778 | 11/2015 |
| WO | WO 2016/089706 | 6/2016 |
| WO | WO 2016/123144 A2 | 8/2016 |
| WO | WO 2016/162298 | 10/2016 |
| WO | WO 2016/191127 | 12/2016 |
| WO | WO 2017/048929 A1 | 3/2017 |
| WO | WO 2017/048931 A1 | 3/2017 |
| WO | WO 2017/050781 A1 | 3/2017 |
| WO | WO 2017/060017 A1 | 4/2017 |
| WO | WO 2017/070391 | 4/2017 |

(56) References Cited

FOREIGN PATENT DOCUMENTS

| WO | WO 2017/151441 | 9/2017 |
|---|---|---|
| WO | WO 2017/151716 | 9/2017 |
| WO | WO 2017/151963 | 9/2017 |
| WO | WO 2017/153077 | 9/2017 |
| WO | WO 2018/136901 | 7/2018 |

OTHER PUBLICATIONS

Search and Examination Report, dated Feb. 23, 2015, by the Intellectual Property Office, in the matter of Application No. GB1414892.8 of TruInject Medical Corporation, 6 pp.
Desjardins, et al. "Epidural needle with embedded optical fibers for spectroscopic differentiation of tissue: ex vivo feasibility study", Biomedical Optics Express, vol. 2(6): pp. 1-10. Jun. 2011.
Inition. Virtual Botox: Haptic App Simulated Injecting the Real Thing. Retrieved from http://inition.co.uk/case-study/virtual-botox-haptic-app-simulates-injecting-real-thing.
Search and Examination Report for Appl. No. GB1319193.7 in 6 pages dated Mar. 28, 2014.
Search Report and Written Opinion for Appl. No. PCT/US2013/067352 dated Mar. 31, 2014 in 10 pages.
Sutherland, et al. "An Augmented Reality Haptic Training Simulator for Spinal Needle Procedures," IEEE, 2011.
International Search Report and Written Opinion of the International Searching Authority regarding International Application No. PCT/US2015/019974, dated May 21, 2015, 10 pages.
Afzal, et al., "Use of Earth's Magnetic Field for Mitigating Gyroscope Errors Regardless of Magnetic Perturbation," Sensors 2011, 11, 11390-11414; doi:10.3390/s111211390, 25 pp. published Nov. 30, 2011.
Andraos et al., "Sensing your Orientation" Address 2007, 7 pp.
Arms, S.W., "A Vision for Future Wireless Sensing Systems," 44 pp., 2003.
Bao, et al., "A Novel Map-Based Dead-Reckoning Algorithm for Indoor Localization", J. Sens. Actuator Networks, 2014, 3, 44-63; doi:10.3390/jsan3010044, 20 pp., Jan. 3, 2014.
Benbasat et al., "An Inertial Measurement Framework for Gesture Recognition and Applications," I. Wachsmuth and T. Sowa (Eds.): GW 2001, Springer-Verlag Berlin Heidelberg, 12 pp., 2002.
Bergamini et al., "Estimating Orientation Using Magnetic and Inertial Sensors and Different Sensor Fusion Approaches: Accuracy Assessment in Manual and Locomotion Tasks", Oct. 2014, 18625-18649.
Brunet et al., "Uncalibrated Stereo Vision," A CS 766 Project, University of Wisconsin—Madison, 6 pp, Fall 2004, http://pages.cs.wisc.edu/~chaol/cs766/.
Brunet et al., "Uncalibrated Stereo Vision," A CS 766 Project, University of Wisconsin—Madison, 13 pp, Fall 2004, http://pages.cs.wisc.edu/~chaol/cs766/.
"EPGL Medical Invents Smart Epidural Needle, Nerve Ablation and Trigger Point Treatment Devices: New Smart Medical Devices Will Give Physicians Advanced Situational Awareness During Critical Procedures," EPGL Medical, dated Aug. 12, 2013, in 3 pages. Retrieved from http://www.prnewswire.com/news-releases/epgl-medical-invents-smart-epidural-needle-nerve-ablation-and-trigger-point-treatment-devices-219344621.html#.
"The EpiAccess System: Access with Confidence", EpiEP Epicardial Solutions, dated 2015, in 2 pages.
Esteve, Eric, "Why do you need 9D Sensor Fusion to support 3D orientation?", 5 pp., Aug. 23, 2014, https://www.semiwiki.com/forum/content/3794-why-do-you-need-9d-sensor-fusion-support-3d-orientation.html.
Grenet et al., "spaceCoder: a Nanometric 3D Position Sensing Device," CSEM Scientific & Technical Report, 1 page, 2011.
Helen, L., et al. "Investigation of tissue bioimpedance using a macro-needle with a potential application in determination of needle-to-nerve proximity", Proceedings of the 8th International Conference on Sensing Technology, Sep. 2-4, 2014, pp. 376-380.
Kalvøy, H., et al., "Detection of intraneural needle-placement with multiple frequency bioimpedance monitoring: a novel method", Journal of Clinical Monitoring and Computing, Apr. 2016, 30(2):185-192.
Madgwick, Sebastian O.H., "An efficient orientation filter for inertial and inertial/magnetic sensor arrays," 32 pp., Apr. 30, 2010.
Microsoft, "Integrating Motion and Orientation Sensors," 85 pp., Jun. 10, 2013.
Miller, Nathan L., Low-Power, Miniature Inertial Navigation System with Embedded GPS and Extended Kalman Filter, MicroStrain, Inc., 12 pp., 2012.
MPU-9150 9-Axis Evaluation Board User Guide, Revision 1.0, 15 pp., May 11, 2011, http//www.invensense.com.
MPU-9150, Register Map and Descriptions, Revision 4.2, 52 pp., Sep. 18, 2013, http//www.invensense.com.
MPU-9150, Product Specification, Revision 4.3, 50 pp., Sep. 18, 2013, http//www.invensense.com.
PST Iris Tracker, Plug and Play, 3D optical motion tracking specifications, 1 p., Dec. 4, 2014, www.pstech.com.
PST Iris Tracker, Instruction Manual, 3D optical motion tracking specifications, 42 pp., Jul. 27, 2012, www.pstech.com.
Struik, Pieter, "Ultra Low-Power 9D Fusion Implementation: A Case Study," Synopsis, Inc., 7 pp., Jun. 2014.
Varesano, Fabio, "Prototyping Orientation and Motion Sensing Objects with Open Hardware," Dipartimento di Informatica, Univ. Torino, http://www.di.unito.it/~varesano, Feb. 10, 2013, 4 pp.
Varesano, Fabio, "FreeIMU: An Open Hardware Framework for Orientation and Motion Sensing," Dipartimento di Informatica, Univ. Torino, http://www.di.unito.it/~varesano, Mar. 20, 2013, 10 pp.
Correa et al., "Virtual Reality Simulator for Dental Anesthesia Training in the Inferior Alveolar Nerve Block," Journal of Applied Oral Science, vol. 25, No. 4, Jul./Aug. 2017, pp. 357-366.
Garg et al., "Radial Artery cannulation—Prevention of pain and Techniques of cannulation: review of literature," The Internet Journal of Anesthesiology, vol. 19, No. 1, 2008, in 6 pages.
Jafarzadeh et al., "Design and construction of an automatic syringe injection pump," Pacific Science Review A: Natural Science and Engineering 18, 2016, in 6 pages.
Kettenbach et al., "A robotic needle-positioning and guidance system for CT-guided puncture: Ex vivo results," Minimally Invasive Therapy and Allied Technologies, vol. 23, 2014, in 8 pages.
Ladjal, et al., "Interactive Cell Injection Simulation Based on 3D Biomechanical Tensegrity Model," 2008 IEEE/RSJ International Conference on Intelligent Robots and Systems, in 9 pages.
Lee et al., "An Intravenous Injection Simulator Using Augmented Reality for Veterinary Education and its Evaluation," Proceedings of the 11th ACM SIGGRAPH International Conference on Virtual-Reality Continuum and its Applications in Industry, Dec. 2-4, 2012, in 4 pages.
Poyade et al., "Development of a Haptic Training Simulation for the Administration of Dental Anesthesia Based Upon Accurate Anatomical Data," Conference and Exhibition of the European Association of Virtual and Augmented Reality, 2014, in 5 pages.
Quio, "Smartinjector," available at https://web.archive.org/web/20161017192142/http://www.quio.com/smartinjector, Applicant believes to be available as early as Oct. 17, 2016, in 3 pages.
State Electronics, "Sensofoil Membrane Potentiometer," Product Information and Technical Specifications, in 6 pages.
Truinject Corp., "Smart Injection Platform," http://truinject.com/technology/, in 3 pages.
"A beginner's guide to accelerometers," Dimension Engineering LLC, accessed Jul. 11, 2018, in 2 pages, https://www.dimensionengineering.com/info/accelerometers.
"Accelerometer: Introduction to Acceleration Measurement," Omega Engineering, Sep. 17, 2015, 3 pages, https://www.omega.com/prodinfo/accelerometers.html.

* cited by examiner

Botox® Training

Training Location: Crow's Feet

| Test Number | Score |
|---|---|
| 1 | |
| 2 | |
| 3 | |
| 4 | |
| 5 | |

Main Menu | Training Menu

TRUINJECT

Botox® Training

Training Location: Crow's Feet

| Test Number | Score |
|---|---|
| 1 | 50% |
| 2 | 60% |
| 3 | 70% |
| 4 | 80% |
| 5 | 90% |

Main Menu | Training Menu | View Results |  TRUINJECT

Certification Mode

Select Certification Test

○ Botox®
○ Juverderm® (Click Here to Order)
○ Sculptra® (You require 4 more hours)
○ Voluma® (Click Here to Order)

Main Menu

TRUINJECT

Certification Test

Test Location: Botox®

| Injection Site | Results |
|---|---|
| Glabellar | Completed |
| Crow's Feet | Completed |
| Frontalis | Completed |
| Mentalis | Completed |
| Platysma | Completed |

View Results

TRUINJECT

US 10,290,231 B2

AUTOMATED DETECTION OF PERFORMANCE CHARACTERISTICS IN AN INJECTION TRAINING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57.

This application claims benefit of U.S. Provisional Patent Application No. 61/952,579, filed Mar. 13, 2014, and titled "COSMETIC AND THERAPEUTIC TRAINING," the entire disclosure of which is hereby incorporated by reference and made part of this specification as if set forth fully herein in its entirety.

This application is also related to U.S. patent application Ser. No. 14/595,972, filed Jan. 13, 2015; U.S. patent application Ser. No. 14/230,294, filed on Mar. 31, 2014; U.S. patent application Ser. No. 14/521,267, filed on Oct. 22, 2014; U.S. patent application Ser. No. 14/598,614, filed Jan. 16, 2015; U.S. Provisional Patent Application No. 62/009,543, filed Jun. 9, 2014; and U.S. Provisional Patent Application No. 62/094,881, filed Dec. 19, 2014. The entire disclosure of each of the above-referenced items is hereby incorporated by reference and made part of this specification as if set forth fully herein in its entirety.

BACKGROUND

The present application relates generally to cosmetic and therapeutic training, and more specifically to systems, devices, and methods for cosmetic and therapeutic training.

A variety of medical injection procedures are often performed in prophylactic, curative, therapeutic, or cosmetic treatments. Injections may be administered in various locations on the body, such as under the conjunctiva, into arteries, bone marrow, the spine, the sternum, the pleural space of the chest region, the peritoneal cavity, joint spaces, and internal organs. Injections can also be helpful in administering medication directly into anatomic locations that are generating pain. These injections may be administered intravenously (through the vein), intramuscularly (into the muscle), intradermally (beneath the skin), subcutaneously (into the fatty layer of skin), or by way of intraperitoneal injections (into the body cavity). Injections can be performed on humans as well as animals. The methods of administering injections typically vary for different procedures and may depend on the substance being injected, the needle size, or the area of injection.

Injections are not limited to treating medical conditions, but may be also used to treat aesthetic imperfections or to perform restorative cosmetic procedures. Many of these procedures are performed through injections of various products into different parts of the body. The aesthetic and therapeutic injection industry comprises two main categories of injectable products: neuromodulators and dermal fillers. The neuromodulator industry commonly utilizes nerve-inhibiting products such as Botox®, Dysport®, and Xeomin®, among others. The dermal filler industry utilizes products administered by providers to patients for both cosmetic and therapeutic applications, such as, for example, Juvederm®, Restylane®, Belotero®, Sculptra®, Artefill®, and others. The providers or injectors may include plastic surgeons, facial plastic surgeons, oculoplastic surgeons, dermatologists, nurse practitioners, dentists, and nurses, among others.

One of the major problems in the administration of injections is that there is no official certification or training process. Anyone with a minimal medical related license may inject a patient. These "injectors" may include primary care physicians, dentists, veterinarians, nurse practitioners, nurses, physician's assistants, or aesthetic spa physicians. However, the qualifications and training requirements for injectors vary by country, state, and county. For example, in most states in the United States, the only requirement to inject patients with neuromodulators and/or fillers is a nursing degree or medical degree. This causes major problems with uniformity and expertise in administering injections. The drawbacks resulting from a lack of uniformity in training and expertise are widespread throughout the medical industry. Doctors and practitioners often are not well trained in administering injections for diagnostic, therapeutic, and cosmetic purposes. This lack of training often leads to instances of chronic pain, headaches, bruising, swelling, or bleeding in patients.

Current injection training options are classroom-based, with hands-on training performed on live models. The availability of models is limited. Moreover, even when available, live models are limited in the number and type of injections that may be performed on them. The need for live models is restrictive because injectors are unable to be exposed to a wide and diverse range of situations in which to practice. For example, it may be difficult to find live models with different skin tones or densities. This makes the training process less effective because patients often have diverse anatomical features as well as varying prophylactic, curative, therapeutic, or cosmetic needs. Live models are also restrictive because injectors are unable to practice injection methods on internal organs due to health considerations. As a result of these limited training scenarios, individuals seeking treatments involving injections have a much higher risk of being treated by an inexperienced injector. This may result in low patient satisfaction with the results, or in failed procedures. In many instances, patients have experienced lumpiness from incorrect dermal filler injections. Some failed procedures may result in irreversible problems and permanent damage to a patient's body. For example, patients have experienced vision loss, direct injury to the globe of the eye, and brain infarctions where injectors have incorrectly performed dermal filler procedures. Other examples of side effects include inflammatory granuloma, skin necrosis, endophthalmitis, injectable-related vascular compromise, cellulitis, biofilm formation, subcutaneous nodules, fibrotic nodules, and other infections.

Given the varying qualifications and training requirements for injectors, there is currently no standard to train, educate, and certify providers on the proper and accurate process of various injection techniques. Patients seeking injections also have few resources for determining the qualifications or experience of a care practitioner.

Given the variety of injectable products, it is desirable to provide effective, efficient, and extensible training injection systems, methods, and devices that cater not only to those products available today but also to those yet to be deployed.

SUMMARY

The embodiments described herein provide distinct improvements to injection training technology, namely the collection, processing, analysis, and display of measured information associated with the delivery of an injection. In particular, sensor-based measurements of a syringe's position and orientation in three-dimensional space—as the syringe delivers an injection into a training apparatus—are obtained and processed to provide metrics of a trainee's injection performance. The measurements can be combined with a digital model of the training apparatus to deliver a computer-generated, graphical depiction of the training injection as it occurs in real time as well as in replay after the training injection is competed. The graphical depiction provides improved visibility into the injection by presenting, for example, different layers of tissue corresponding to the portion of anatomy being injected. Additionally, the computer-generated, graphical depiction enables visualization of the injection from perspectives unavailable in the physical world. For example, the computer-generated, graphical depiction can display the syringe's needle tip within the anatomy as the injection progresses. Viewed perspectives can be enlarged, reduced, rotated and panned to provide multiple perspectives of the injection. Sensor-based measurements of a pressure applied to a syringe plunger and/or to the training apparatus by the syringe can also be obtained and processed to provide additional metrics associated with a trainee's injection performance. Illustratively, measurements of pressure applied to the syringe plunger can be processed along with position and orientation measurements to graphically depict a flow of therapeutic agent being delivered from the syringe to the anatomy.

The embodiments described herein also provide a distinct improvement to the capability to monitor and evaluate injection training activity and performance. The training injection execution, as reflected in the measured sensor-based data, can be reviewed and analyzed at times after, and in locations different than, the time and location of the training injection. Additionally, one or more collections of injection training data associated with multiple training injections performed by multiple trainees can be aggregated and analyzed for trends in performance. A collection of injection training data can include one or more information sets, where an information set can include data collected during an injection training session performed by a trainee using an injection training system. The information set can include information describing dynamic motion of the syringe as the syringe delivers the training injection to the training apparatus, information describing the training apparatus, and information describing the training session, among others.

The systems, methods, devices, and non-transitory, computer-readable media discussed herein include several aspects, no single one of which is solely responsible for its desirable attributes. Without limiting the scope of the disclosed invention as expressed by the claims which follow, some features are discussed briefly below. After considering this discussion, and particularly after reading the section entitled "Detailed Description," it will be understood how advantageous features of this disclosure include, among other things, improved injection training.

In one aspect of the present disclosure, an injection training system is described. The injection training system includes a training apparatus, a syringe, a display device, a training server, a data store, a training portal, and one or more networks configured to enable communication between the training apparatus, the syringe, the display device, the training server, the data store, and the training portal. The training apparatus includes a training portion that is configured to represent an object to which a training injection may be delivered and to receive the training injection delivered by the syringe. The training portion of the training apparatus can be configured to represent, by way of non-limiting examples, the following: an anatomy, a part of an anatomy, a human anatomy, a part of a human anatomy, a training and certification head, a human head, a human face, a non-human anatomy, a part of a non-human anatomy, an inanimate object, and a mechanical device.

In some embodiments the training apparatus further comprises an apparatus sensor. The apparatus sensor can be located external to, internal to, or integrated into the training apparatus. The apparatus sensor can be configured to obtain apparatus sensor information associated with one or more characteristics of the syringe as the syringe is used to deliver the training injection to the training portion of the training apparatus. Illustratively, the apparatus sensor information can correspond to the position and orientation of the syringe as it delivers the injection to the training apparatus, including by way of non-limiting example, a video feed or other signal indicative of detected light, a sensor position value relative to a longitudinal axis, a sensor position value relative to a lateral axis, a sensor position value relative to a vertical axis, a sensor position roll value, a sensor position pitch value, a sensor position yaw value, and a sensor profile characteristic. In some embodiments the apparatus sensor comprises an optical measurement and tracking system configured to measure information corresponding to a three-dimensional position and orientation of the syringe. In some embodiments the apparatus sensor comprises a three-dimensional tracking system comprising at least two stereoscopic cameras. In other embodiments, the apparatus sensor comprises a first camera positioned within a hollow portion of the of the training apparatus, where the first camera has a first center point; a second camera positioned within the hollow portion of the training apparatus, where the second camera has a second center point; and wherein the first center point is aligned with the second center point, and wherein the first and second cameras are configured to operate stereoscopically.

In an aspect of the present disclosure, the syringe includes a syringe sensor configured to obtain information associated with one or more characteristics of the syringe as the syringe delivers the training injection to the training portion of the training apparatus. The syringe sensor can be located external to, internal to, or integrated into the syringe. In some embodiments the syringe sensor comprises a magnetometer configured to measure information corresponding to characteristics of a magnetic field, including the earth's magnetic field. The magnetometer can be configured to measure information corresponding to characteristics of a magnetic field with respect to one, two, or three dimensions. In some embodiments the syringe sensor comprises an accelerometer configured to measure information corresponding to characteristics of a linear acceleration of the syringe, and can be configured to measure information corresponding to characteristics of a linear acceleration of the syringe with respect to one, two, or three dimensions. In some embodiments the syringe sensor comprises a gyroscope configured to measure information corresponding to characteristics of an angular velocity of the syringe, and can be configured to measure information corresponding to characteristics of an angular velocity of the syringe with respect to one, two, or three dimensions. In some embodiments the syringe sensor comprises an inertial measurement sensor configured to measure information corresponding to a position and orientation of the syringe, and can be configured to measure information corresponding to the position and orientation of the syringe with respect to one, two, or three dimensions. In some embodiments the syringe sensor comprises a pressure sensor configured to capture information corresponding to a position of a needle tip of the syringe as the syringe delivers the training injection to the training portion of the training apparatus.

In yet another aspect of the present disclosure, the training apparatus includes a base portion comprising an apparatus sensor interface configured to receive the apparatus sensor information and a processor configured to process the apparatus sensor information, the processor further configured to transmit to, the display device and/or to the server, the apparatus sensor information.

In some embodiments of the disclosed injection training system, the training apparatus comprises a training portion configured to represent an object to which an injection may be delivered, where the training portion is further configured to receive the training injection delivered by the syringe; a sensor configured to obtain sensor information associated with a characteristic of the syringe as the syringe is used to deliver the training injection to the training portion of the training apparatus; and a base portion comprising: a sensor interface configured to receive the sensor information from the sensor; and a processor configured to process the sensor information, the processor further configured to transmit, to the display device and/or to the server, the sensor information. In some embodiments the processor is further configured to transmit, to the display device and/or to the server, the sensor information and/or the processed sensor information.

In some embodiments of the disclosed injection training system, the syringe comprises a syringe sensor configured to obtain syringe sensor information associated with a characteristic of the syringe as the syringe is used to deliver the training injection. The sensor interface is configured to receive the syringe sensor information and the processor is configured to transmit, to the display device and/or to the server, the processed sensor information and the processed syringe sensor information.

In another aspect of the disclosed injection training system, the base portion of the training apparatus further comprises a syringe interface configured to receive, from the syringe, syringe information associated with a characteristic of the syringe as the syringe is used to deliver the training injection to the training portion of the training apparatus; a sensor processor configured to process the sensor information; a syringe processor configured to process the syringe information; a memory device configured to store information; and a network input/output interface configured to transmit and receive information by way of a network. In some embodiments the base portion further comprises a display device input/output interface configured to transmit and receive information between the training apparatus and the display device.

An embodiment of the disclosed injection training system comprises a training syringe configured to deliver a training injection, the training syringe having a syringe sensor configured to obtain syringe information associated with a characteristic of the training syringe; a display device configured to present information associated with the training injection; and a training apparatus comprising: a training portion configured to represent an object to which the training injection may be delivered and to receive the training injection, the training portion comprising an apparatus sensor configured to obtain apparatus information associated with a characteristic of the training syringe relative to the training portion of the training apparatus; and a base portion configured to receive and to process the syringe information and the apparatus information, the base portion further configured to transmit the syringe information and the apparatus information to the display device. In some embodiments the base portion of the training apparatus further comprises a processing unit that comprises a sensor interface configured to communicate with the syringe sensor and with the apparatus sensor; a processor, coupled to the sensor interface, the processor configured to process the syringe information and the apparatus information; a memory device, coupled to the processor, the memory device configured to store information; and a network interface configured to transmit and receive information over a network.

In some embodiments the base portion further comprises a syringe sensor interface configured to communicate with the syringe sensor; an apparatus sensor interface configured to communicate with the apparatus sensor; a syringe sensor processor configured to receive and to process the syringe information; an apparatus sensor processor configured to receive and process the apparatus information; a memory device, coupled to the syringe sensor processor and to the apparatus sensor processor, the memory device configured to store information; and a network interface configured to transmit and receive information over a network. The base portion further comprises a display device interface configured to transmit and receive information between the training syringe, the training apparatus, and the display device.

Another embodiment of the disclosed injection training system comprises a training apparatus configured to receive a training injection; a syringe configured to deliver the training injection; a display device in communication with the training apparatus and with the syringe; a server in communication with the display device; a training portal in communication with the server; and a data store in communication with the server. In some embodiments the server is in communication with the training apparatus and with the syringe.

Yet another embodiment of the disclosed injection training system comprises a training syringe having a needle and a position sensor, where the position sensor is configured to obtain position information corresponding to the training syringe; an injection apparatus configured to receive a training injection by the training syringe; a processing unit, having a processor and a memory device, wherein the processing unit is configured to receive and to process the position information and to transmit the position information and/or the processed position information; and a display device configured to receive the position information and/or the processed position information to display position data reflective of the position information. The position sensor is further configured to obtain multiple measurements of position information of the training syringe over time. In an embodiment, the processor is configured to determine a location of the needle with respect to an injection site on the injection apparatus and to display the determined location of the needle with respect to an injection site on the display device. In some embodiments the displayed location of the needle comprises an animated depiction of the needle in relation to the injection site on the injection apparatus.

In some embodiments the position sensor comprises an inertial measurement unit. The inertial measurement unit can, in some embodiments, include a first sensor configured to measure angular velocity information, a second sensor configured to measure linear acceleration information, and a third sensor configured to measure magnetic field information. In some embodiments the position sensor includes a first sensor configured to measure angular velocity information, a second sensor configured to measure linear acceleration information, and a third sensor configured to measure magnetic field information. In some embodiments the first sensor measures angular velocity information in three dimensions, the second sensor measures linear acceleration information in three dimensions, and the third sensor measures magnetic field information in three dimensions. In some embodiments the first sensor comprises a gyroscope, the second sensor comprises an accelerometer, and the third sensor comprises a magnetometer. In some embodiments the processor is further configured to process the measured nine dimensions of information to determine an estimate of position and orientation of the training syringe in three-dimensional space.

In an embodiment, the injection apparatus further comprises a training portion comprising: an at least partially hollow base structure configured to provide structural support; a clear layer of elastomer coating at least partially covering the base structure; an opaque layer at least partially covering the clear layer, wherein the base structure, clear layer, and opaque layer form an anatomical shape; and an apparatus sensor configured to determine a location of the needle when the needle is inserted into the clear layer of elastomer. In some embodiments, the apparatus sensor is positioned inside the at least partially hollow base structure of the training portion of the injection apparatus. In some embodiments the apparatus sensor comprises a three-dimensional tracking system, and wherein the three-dimensional tracking system is further configured to track multiple locations of the needle over time. In some embodiments, the three-dimensional tracking system comprises a camera, in some embodiments the three-dimensional tracking system comprises at least two cameras configured to operate stereoscopically, and in some embodiments the three-dimensional tracking system comprises an array of light sensors. In some embodiments the needle of the training syringe comprises a distal tip configured to emit a light therefrom. In some embodiments the three-dimensional tracking system is configured to determine the location of the needle based on a measurement of one or more characteristics of an emission from the needle. In some embodiments the emission is light, and the characteristics of the emission include intensity, angle, dispersion, brightness, color, and duration of the light.

In another aspect of the present disclosure, a method to improve performance of an injection technique is described. The method comprises obtaining injection information associated with a training injection of the injection technique; analyzing the injection information; and recommending, based on the analyzed injection information, an action to improve injection technique. The method can further comprise evaluating the injection information relative to at least one evaluation criterion. The injection information can include: a target location for the training injection; a location on a training apparatus where the training injection was delivered; a determination of whether the training injection was delivered to the target location; a depth of the training injection; an amount of therapeutic agent delivered by the training injection; a duration of the training injection; an angle of entry of the training injection; a determination as to whether the training injection passed or failed an injection test; a score; an accuracy rating; an overall rating; and an average score for the training injection performed when performed more than once. Evaluating the injection information relative to at least one evaluation criterion can comprise comparing the obtained injection information with at least one performance requirement to determine whether the training injection met the at least one performance requirement. Analyzing the injection information can comprise obtaining injection information associated with a previous training injection of the injection technique and comparing the previous injection information to the obtained injection information. In some implementations, analyzing the injection information comprises obtaining aggregated injection information associated with a plurality of previous training injections (also referred to as one or more collections of injection training data) of the injection technique and comparing the aggregated injection information with the obtained injection information. Recommending, based on the evaluated injection information, an action to improve injection technique comprises identifying training resources directed at an aspect of the injection technique.

In yet another aspect of the present disclosure, a non-transitory, computer-readable medium having stored thereon executable instructions that direct a computing device to perform an injection training process is disclosed. The injection training process comprises the following executable components: a registration component configured to obtain information associated with a user of an injection training system, and based on the obtained information, to establish an account associated with the user; a login component configured to provide, to the user, access to the injection training system when the user authenticates the user's identity; a personal homepage component configured to provide information associated with the user; a training component configured to deliver a training activity to be performed by the user; a training results component configured to present results of the training activity performed by the user; a certification test component configured to deliver a certification test activity to be performed by the user; a certification determination component configured to determine whether the user passed the certification test; and a certification delivery component configured to publish and distribute a certificate indicating that the user passed the certification test activity. In some implementations, the registration component is further configured to obtain biometric information of the user, and the login component is further configured to authenticate the user based at least in part on the biometric information. The biometric information can include at least one of the following: a fingerprint, a retina image, a facial image, an image of palm veins, a sample of DNA, a palm print, a hand geometry, an iris image, a voice print, an odor, and a scent. In some implementations the certification delivery component is configured to create a record in the injection training system indicating that the user passed the certification test activity.

In another aspect of the present disclosure, a method to generate a profile of a trainee in an injection training system is described. The method comprises: receiving, from the trainee, a request to generate the trainee profile; obtaining training and test information associated with the trainee; obtaining resources to be accessed by the trainee; obtaining injection information associated with the trainee; obtaining training offerings purchased for the trainee; obtaining certifications for the trainee; generating analytics based, at least in part, on training performed by the trainee; and generating the profile of the trainee. The training and test information associated with the trainee can include resources to be accessed by the trainee, injection information associated with the trainee, training offerings purchased for the trainee, and certifications for the trainee are obtained at least in part, from a data store within the injection training system. In some implementations, generating analytics based on training performed by the trainee further comprises: obtaining, from the injection training system, aggregated information associated with training performed by at least one injector other than the trainee; analyzing the aggregated information to determine an average training performance level; and assessing a performance level of the trainee relative to the average training performance level. In some implementations generating analytics based on training performed by the trainee further comprises: obtaining, from the injection training system, aggregated information associated with training performed by at least one injector other than the trainee; and identifying, from the obtained aggregated information, one or more injection behaviors associated with injection techniques that are used by successful injectors. In some implementation, generating analytics based on training performed by the trainee further comprises: obtaining, from the injection training system, a collection of injection training data associated with training performed by at least one injector other than the trainee; analyzing the collection of injection data to determine an average training performance level; and assessing a performance level of the trainee relative to the average training performance level.

In another aspect of the present disclosure, a method for injection training is described. The method comprises receiving a message identifying a trainee; obtaining a training module that identifies a target injection profile for a specified injection site and for a specified injection substance, wherein the target injection profile includes characteristics of a desired injection outcome for the specified injection site and injection substance; obtaining injection data reflective of a training injection performed by the trainee, the injection data including at least one characteristic associated with a syringe used to deliver the training injection; analyzing the injection data relative to the target injection profile; and providing feedback, to the trainee, based at least in part on the obtained injection data.

In another aspect of the present disclosure an injection system is described. The injection system comprises a plurality of training apparatus, each training apparatus including a training portion and a syringe; a training server in data communication with said plurality of training apparatus, said training server configured to transmit and receive injection information from one or more of said plurality of training apparatus, said injection information identifying one or more characteristic of the associated syringe during a training session for a particular training apparatus of said plurality of training apparatus; and a display device in data communication with at least one of said plurality of training apparatus and said training server, said display device configured to view said injection information for the at least one of said plurality of training apparatus.

In yet another aspect of the present disclosure, an injection training apparatus is described. The training apparatus comprises a training portion including a sensor; a syringe including an emitter configured to generate an emission detectable by the sensor; and a housing coupled to and supporting the training portion, the housing including: means for communicating with the sensor; means for communicating with the syringe; means for transmitting information obtained from the sensor and the syringe via a network, the information indicative of one or more characteristic of the syringe during a training session; and means for receiving training information, including configuration information, for at least one of the sensor and the syringe, the configuration information indicative of an injection test for an injectable substance at an injection site on the training portion.

In another aspect of the present disclosure a method of injection training is described. The method comprises receiving an electronic message identifying a trainee; transmitting a training module to an embedded processing unit, said training module identifying a target injection profile for specified injection site and injectable substance; after completion of said training module, receiving injection data for the trainee for the training module, said injection data identifying one or more characteristic of a syringe during the training, said injection data associated with a training apparatus upon which said training module was performed; and providing feedback, based at least in part, on said received injection data.

In another aspect of the present disclosure a non-transitory, computer-readable medium including instructions executable by a processor of an electronic device is described. The instructions cause the electronic device to receive an electronic message identifying a trainee; transmit a training module to an embedded processing unit, said training module identifying a target injection profile for specified injection site and injectable substance; after completion of said training module, receive injection data for the trainee for the training module, said injection data identifying one or more characteristic of a syringe during the training, said injection data associated with a training apparatus upon which said training module was performed; and provide feedback based at least in part on said received injection data.

In yet another aspect of the present disclosure an injection training system is described. The injection training system comprises a training apparatus configured to receive a training injection; a syringe, having a needle, the syringe configured to deliver the training injection; a display device in communication with the training apparatus and with the syringe, the display device having at least one processor, the processor causing a view to be displayed on the display device; and a server in communication with the display device. In some embodiments, the view to be displayed comprises at least one of a login interface view, a personalized profile page view, a progress dashboard view, a training mode interface view, a training resources view, a training view, a training results view, a certification mode view, a certification test interface view, and a certification interface view.

In another aspect of the present disclosure a method to analyze a collection of injection training data is described. The method comprises receiving the collection of injection training data, the collection of injection training data comprising information sets, wherein an information set comprises data collected during an injection training session performed by a trainee using an injection training system, wherein the injection training system comprises a training apparatus configured to receive a training injection, a syringe, having a needle and a plunger, the syringe configured to deliver the training injection, and at least one sensor configured to sense information associated with the training session. The information set comprises information describing dynamic motion of the syringe as the syringe delivers the training injection to the training apparatus; information describing the training apparatus; and information describing the training session. The method further comprises converting the collection of injection training data by grouping various types of data into a same format and assigning a label indicating a category of item contents, such that the converted collection of injection training data is in condition for training injection performance analysis; and generating an aggregate assessment of injection training performance.

In some embodiments the at least one sensor comprises an inertial measurement unit positioned within the syringe, an optical measurement and tracking system configured to measure information corresponding to a three-dimensional position and orientation of the syringe, and/or a three-dimensional tracking system comprising at least two stereoscopic cameras configured to measure information corresponding to a three-dimensional position and orientation of the syringe. In some embodiments the information describing dynamic motion of the syringe as the syringe delivers the training injection to the training apparatus comprises a measure of force provided by a force sensor; a measure of position provided by a position sensor; and a measure of orientation provided by the position sensor. In some embodiments the measure of force provided by the force sensor corresponds to a force applied to the plunger of the syringe and is processed to determine of an amount of therapeutic agent delivered by the training injection, or an estimate of an amount of therapeutic agent simulated to have been delivered by the training injection. In some embodiments the measure of force provided by the force sensor corresponds to a force applied to the training apparatus.

In an embodiment of the method to analyze a collection of injection training data, the information describing dynamic motion of the syringe as the syringe delivers the training injection to the training apparatus comprises: a measure of force provided by a force sensor; a measure of position provided by a position sensor; and a measure of orientation provided by the position sensor. In some embodiments, the measure of force provided by the force sensor corresponds to a force applied to the plunger of the syringe and is processed to determine an estimate of an amount of therapeutic agent delivered by the training injection. In an embodiment, the measured force applied to the plunger of the syringe is processed to determine an estimate of an amount of therapeutic agent simulated to have been delivered by the training injection. In another embodiment, the measure of force provided by the force sensor corresponds to a force applied to the training apparatus. In some embodiments, the measure of position provided by the position sensor corresponds to a position of the syringe in three-dimensional space, and the measure of orientation provided by the orientation sensor corresponds to an orientation of the syringe in three-dimensional space. In some embodiments, the position sensor and the orientation sensor comprise an inertial measurement unit. The inertial measurement unit can further comprise: a first sensor to measure linear acceleration; a second sensor to measure angular velocity; and a third sensor to measure magnetic force. In some embodiments, the first sensor comprises an accelerometer, the second sensor comprises a gyroscope, and the third sensor comprises a magnetometer.

In some embodiments, the information describing dynamic motion of the syringe as the syringe delivers the training injection to the training apparatus includes an angle of approach of the syringe needle relative to the training apparatus; an angle of entry of the syringe needle into the training apparatus; a depth of penetration of the needle within the training apparatus; an amount of force applied by the syringe to the training apparatus; an amount of therapeutic agent delivered to the training apparatus; an estimated amount of therapeutic agent simulated to have been delivered to the training apparatus; a description of dynamic displacement of the syringe plunger during the training injection; an amount of force applied to the syringe plunger during the training injection; a rate of flow of the therapeutic agent delivered to the training apparatus; an estimated rate of flow of therapeutic agent simulated to have been delivered to the training apparatus; a proximity of the delivered injection relative to a target injection site; or an identification of an anatomical structure affected by the training injection.

In some embodiments, the information describing the training apparatus comprises a digital model of the training apparatus based on information corresponding to the anatomical structure represented by the training apparatus, including, without limitation, a skin layer; a transparent skin layer; a muscle layer; a fat pad layer; a nerve layer; a blood vessel layer; and a bone layer.

In some embodiments, the information describing the training session includes, without limitation, a training date and time; a training location; a trainee identity; a training session duration; a training score; an injection time; and a pass/fail determination.

In some embodiments, the aggregate assessment includes, without limitation, a ranking of injection performances reflected in the collection of injection training data; a ranking of injection performances within a subgroup of injection performances reflected in the collection of injection training data; information sets corresponding to an injection training session performed in a country, a region, a city, or a practice group; a percentage comparison of a quantity of training injections performed by a first trainee relative to a quantity of training injections performed by all trainees represented in the collection of injection training data; a comparison of a training injection performed by a first trainee relative to a training injection performed by an expert in the field; or a comparison of training injections performed by all trainees represented in the collection of injection training data relative to a training injection performed by an expert in the field.

For purposes of summarizing the disclosure, certain aspects, advantages, and novel features have been described herein. Of course, it is to be understood that not necessarily all such aspects, advantages, or features will be embodied in any particular embodiment.

Described in further detail below are aspects of systems, methods, devices, and non-transitory computer-readable media for injection training. The aspects may be combined, in whole or in part, with injection training systems such as those from TruInject™ Medical Corporation, assignee of the present application. While reference to TruInject™ Medical Corporation may be included in the description that follows, it will be understood that the aspects described herein may be applied in other injection contexts and systems without departing from the scope of the present disclosure.

Figure 1:
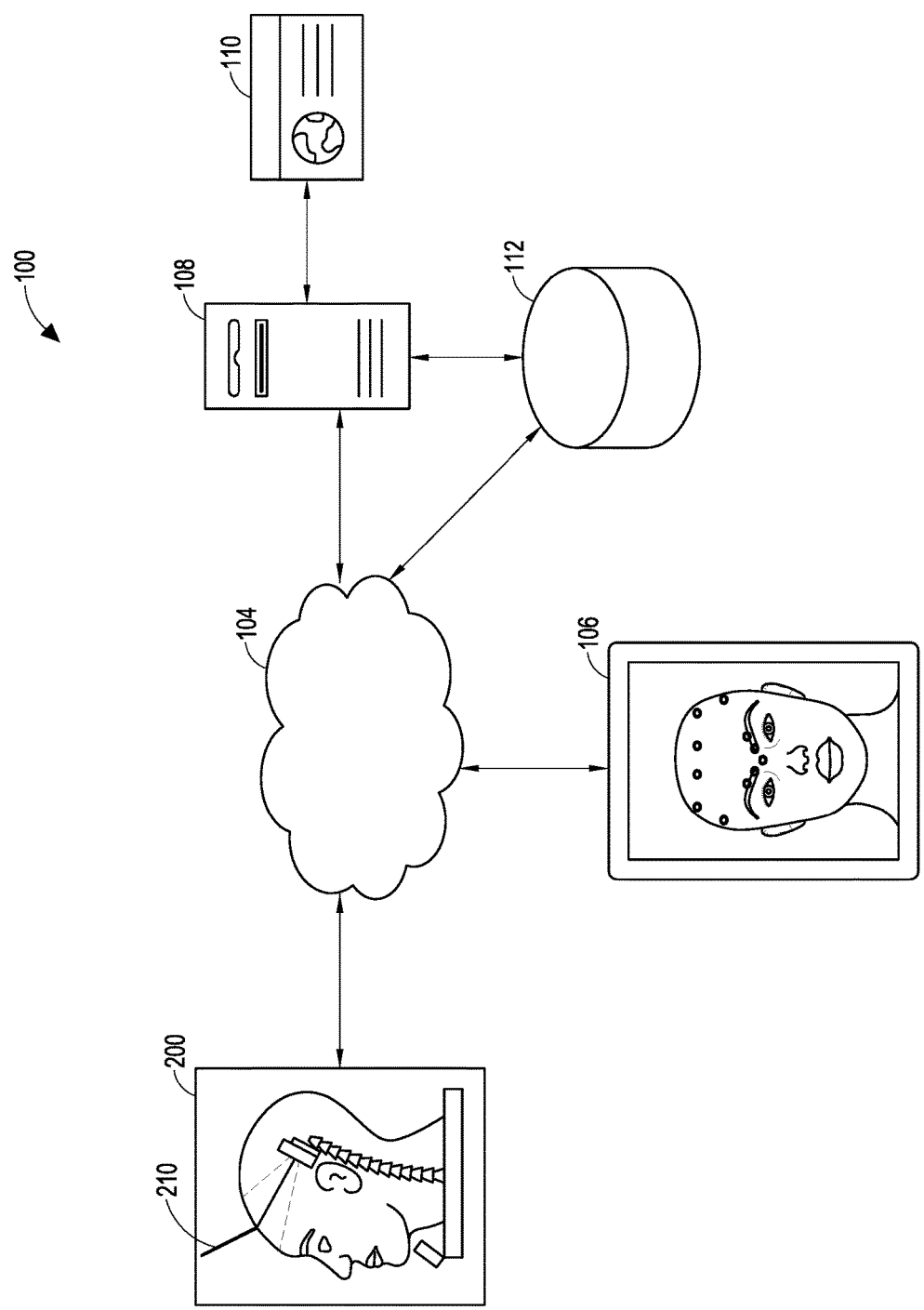
FIG. 1 illustrates an example of an injection training system in which aspects of the present disclosure may be employed.

While the foregoing "Brief Description of the Drawings" references generally various embodiments of the disclosure, an artisan will recognize from the disclosure herein that such embodiments are not mutually exclusive. Rather, the artisan would recognize a myriad of combinations of some or all of such embodiments.

DETAILED DESCRIPTION

The present disclosure generally relates to injection training systems, methods, devices, and non-transitory, computer-readable media. Illustratively, by way of non-limiting example, a trainee may practice injecting into a synthetic face using a syringe in combination with a training and certification head (TCH). The TCH forms a head bust with realistic look and feel of human flesh. The external surface of the TCH may be a substantially synthetic or simulated skin. The synthetic or simulated skin can be an opaque rubber or other material which simulates skin and facial features of real patients. Underlying the skin may be a layer of substantially clear rubber (and/or any suitable elastomer or other material) that simulates the viscosity, elasticity, and feel of skin, muscle, nerve, and bone tissue of a patient. The opaque skin and clear underlay may be capable of being pierced by a needle. The training and certification head and/or syringe may be configured to interact with a local display device (LDD) such as a tablet, notebook computer, or smartphone, to name a few. The training and certification head, syringe, and/or LDD may also be configured to communicate with a training server.

The local display device is configured to show the angle and position of the needle tip reflecting information sent from the syringe and/or the TCH. The set of allowable training and certification modules for which the trainee is authorized to use may be provided by the training server to the syringe and/or the TCH. The trainee or trainee facility may use the system to enroll the trainee and/or to receive an indication of payment of fees. The local display device may be configured to provide information tailored to the trainee logged on to the syringe and/or the TCH. The LDD may display information received from the syringe and/or the TCH and can receive an input message to change the syringe and/or the TCH (and thus trainee) to which it is connected.

Testing performance data can include training pass/fail information, and can also include information detailing the profile of the syringe interaction with the TCH, which can be transmitted from the syringe and/or TCH to the training server. For example, performance feedback may include whether the injection was made in the correct location, the depth of the injection, and the areas in which the injection could have been improved. In one embodiment, performance feedback may include whether a user passed or failed an injection test corresponding to a cosmetic condition or therapeutic treatment. The results may also be in the form of a score, an accuracy rating, or an overall rating.

Based on the injector's performance, there may be a score, rating or ranking calculated and presented to a user requesting information on the injector. The score, rating or ranking can provide an indication of an accuracy of the injections performed, an estimated skill level of the injector, an indication of the experience of the injector, a the number of injections performed, or any other measure indicative of the capability of the injector. A separate score or ranking may be available for different types of injections or injection locations. Illustratively, by way of non-limiting example, a patient searching for an injector experienced in treating crow's feet may access a list of such injectors within a specified geographic area near the patient's location. The injectors may be listed by ranking, rating, or score based on one or more of education, years of experience, performance results with the disclosed injection training system, or patient reviews. The data can also be collected from multiple patients or injectors and analyzed to determine an average level of skill or patient satisfaction. Such performance data can be used to determine the effectiveness of, or the risks associated with a particular treatment. This information may be stored in a database and made available for information retrieval related to the injection training. One non-limiting advantage of the described injection training features is to train optimally on an injection technique to avoid or to correct adverse events. The training can be optimized to process and provide information about the trainee's injection performance, ways to improve performance, and compliance with injection best practices. The trainee's performance information can be transmitted to various parties, including the trainee, other medical professionals, injection manufacturing companies, and insurance companies. The disclosed injection training system may also include a feature to provide public profiles of injectors who elect to make their profiles available. Illustratively, by way of non-limiting example, current or prospective patients may conduct online queries to search for injectors based on, for example, clinical qualifications, geographical locations, and the level of injection training and/or certification completed. Security measures, known to those skilled in the art, to safeguard information obtained from such queries may be practiced to comply with regulations and to respect personal privacy.

Injection training may include providing a website accessible by the trainee, health care provider, training company, or injection manufacturer. The website can provide utilities for the trainee and the manufacturing companies. The company information can be conveyed in a system or format that provides security to exclude unauthorized access. For the trainee, the website can provide on-going tracking of performance, showing improvement in the trainee's injection technique when using the injection training system. The trainee can access the system to perform activities related to injection training, review past training sessions, and the like. One example of an activity is monitoring performance on various training exercises over time. The company receives all or a selected portion training data. The portion may be selected based on the product, trainee, relationship between the trainee and company (e.g., insured-insurer, hospital-provider). The training data may be accumulated at a central records storage site and made accessible for analytics, data mining, scheduling maintenance, product cross-selling, and similar activities.

FIG. 1 shows a network diagram of an example embodiment of an injection training system 100. The injection training system 100 includes a training apparatus 200 that is configured to receive a training injection delivered by a syringe 210. The syringe includes a needle having a needle tip at the distal end of the syringe, a barrel, a plunger at a proximal end of the syringe and configured to exert a force on the barrel. In some embodiments the syringe 210 includes one or more syringe sensors configured to obtain syringe sensor information associated with one or more characteristics of the syringe as it is being used to deliver a training injection. In some embodiments, the training apparatus 200 is configured to represent a human head and face, and may also be referred to as a training and certification head (TCH) 200. The TCH 200 is configured to communicate via a network 104 with a local display device 106, which may also be referred to herein as a "display device" 106. The network 104 may include one or more networking technologies (e.g., satellite, LAN, WAN, cellular, peer-to-peer, etc.). The network 104 may be a public network (e.g., the Internet), or a private network (e.g., a virtual private network, also referred to as a "VPN"). The messages communicated via the network 104 can be transmitted and/or received using appropriate and known network transmission protocols (e.g., TCP/IP). In an embodiment, the TCH 200 can communicate directly with the local display device 106.

The local display device 106 may be an electronic communication device configured for wired or wireless network communications. The local display device 106 includes a visual display such as a touchscreen, monitor, display screen, or the like. In some implementations, the visual display may also be used as an input device, such as a touchscreen. In some implementations, an input device such as a keyboard, keypad, mouse, stylus, camera, biometric sensor, or the like may be coupled with the local display device 106 and configured to provide messages to the local display device 106.

The TCH 200 may also communicate directly or via the network 104 with a training server 108. The training server 108 may provide information about a particular trainee via a training portal 110. The information may be stored in a data store 112. The data store 112 may be in direct communication with the training server 108 or may be accessible via the network 104. The data store 112 may be configured to maintain records for trainees, exercise performance information, observation notes, and other training related data. The data store 112 may also be configured to store training content such as the exercises, educational materials, instructional content, curricula organizing the instructional content for trainees, and the like. The training portal 110 may also be configured to provide a representation of the information about a particular trainee and/or aggregated trainee information to third parties, such as a health care provider or a company administering a training center where the training and certification head 200 is located. In some implementations, the training portal 110 may receive information from users and provide the input to the training server 108. For example, the training portal 110 may present a quiz to a trainee and receive one or more answers to a question included in the quiz. The responsive inputs may be transmitted to the training server 108 and stored in the data store 112 with information associated with the trainee. In an embodiment, a syringe 210 can also communicate wirelessly or through a wired connection with the TCH 200, the local display device 106, and/or the training server 108. In an embodiment, the syringe 210 can communicate directly with the TCH 200 or through the network 104 to the local display device 106 or to the training server 108.

Examples of information that may be uploaded to the training server 108 and maintained in the data store 112 include training date and time; location; trainee; authorization code; session time; maximum score; maximum ranking within a group (national, region, city, affinity); injection time; amount of pressure applied to the syringe 210; track of the needle tip during injection; what muscle, nerve, or artery the syringe 210 is in; pass/fail rates; percentage of injections versus other trainees; number of times injected (e.g., TCH/syringe 210 associated with identifier 4203 has been injected 4500 times); behavior of user "using" syringe 210 (e.g., gaming); report feedback on the trainee's performance as compared to an expert (e.g., the Dr. Jean Carruthers technique); and how this injector "injects" versus others who have undergone such training.

The training server 108 may be configured to analyze the received data. Illustratively, by way of non-limiting example, data can be mined for trainee performance characteristics, including identification of the injection behavior versus scoring, to identify specific techniques that are used by the best injectors. The data may also be mined to identify training and certification heads 200 that need maintenance or replacing. The data may be mined further to identify effective training resources and/or training centers.

Examples of information that may be downloaded from the training server 108 to the TCH 200 include current authorized training modules per trainee; update protocols; and firmware updates, to name a few.

The local display device 106 may exchange messages with the training server 108. Illustratively, such messages can relate to trainee registration, certification and training inquires, purchasing of tests, accessing trainee certification history and related information, identifying the availability of training company resources (including national or local workshops), obtaining a list of certified trainers/facilities, or trainee authentication/verification information (such as trainee-specific biometric information). In some implementations, the local display device 106 may utilize a third-party browser-based service, such as Foursquare® or an equivalent, to allow patients to locate local certified training facilities.

As shown in FIG. 1, the training portal 110 is hosted on a separate device from the training server 108. In some implementations, the training portal 110 may be included in the training server 108.

The local display device 106 may be configured to access the training server 108 via the network 104. The local display device 106 may be configured to receive input regarding a particular training exercise for a particular trainee. For example, an observer may use the local display device 106 to make a note about the test which may be used to evaluate the test results. An example of such a note may be to document an equipment failure or an environmental change (e.g., power outage, earthquake) during the exercise.

Figure 2:
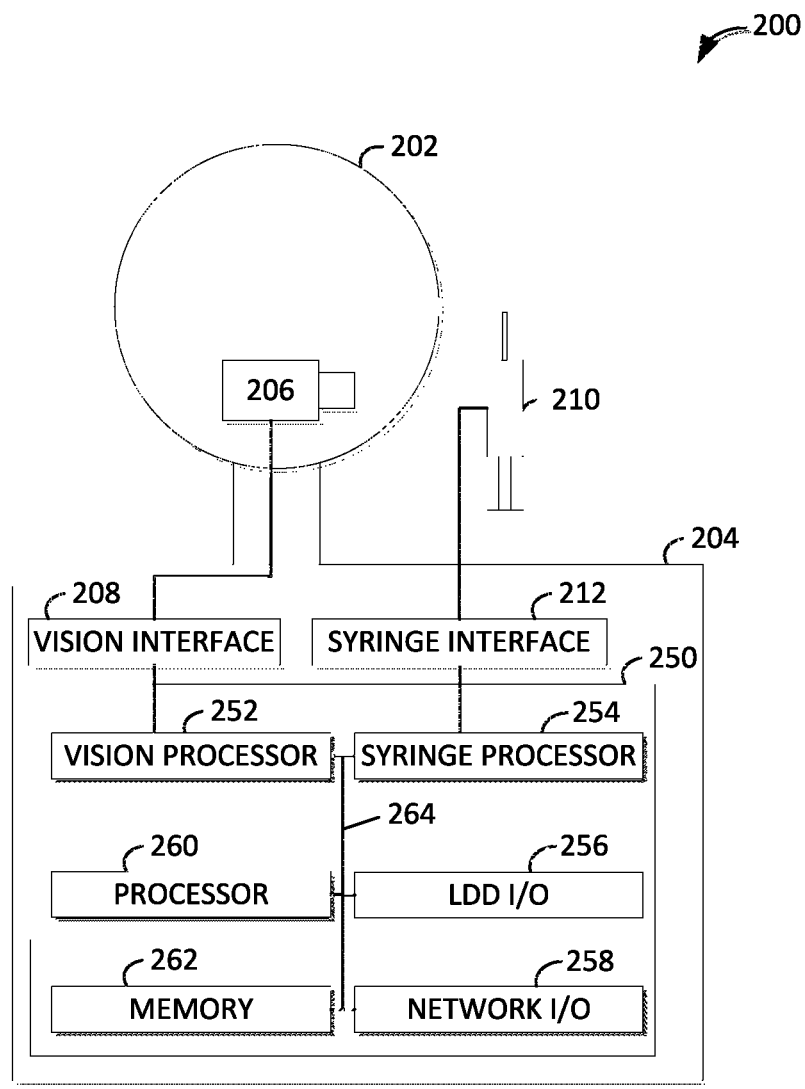
FIG. 2 shows a functional block diagram for an exemplary embodiment of a training and certification head.

FIG. 2 shows a functional block diagram of certain aspects of a training and certification head 200. The training and certification head 200 may be similar to and/or include features of the testing tool shown and described in the commonly assigned U.S. patent application Ser. No. 14/067,829, filed on Oct. 30, 2013 and entitled "System for Cosmetic and Therapeutic Training," which was incorporated herein by reference above.

The TCH 200 includes a training portion 202. When implemented as a human facial injection training system 100, the training portion 202 may be formed to resemble a human head. Other injection training implementations, both human and non-human, are contemplated. For example, shoulder, leg, or other human body parts may be used as the training portion 202. The training portion 202 may be formed for dog, cat, horse, mouse, rat, iguana, or any other animal for injection training. In such implementations, the training portion 202 may be formed to resemble all or a desired part of the animal. In some implementations, the training portion 202 may be formed for mechanical device injection training such as for use with engines, walls, or computing devices. The training portion 202 is connected to a base portion 204.

The training portion 202 may be hollow. Inside the cavity, one or more apparatus sensors 206 may be included to detect the location of a syringe 210. One exemplary embodiment of the one or more sensors 206 shown in FIG. 2 is a camera. The camera is configured to detect characteristics of light which are emitted from the needle tip of syringe 210, which may be referred to as apparatus sensor information, or simply sensor information. Based on the detected characteristics, the location, depth, and other properties of the injection may be determined. The detected characteristics may include light intensity and color. In some implementations the apparatus sensor 206 may be a magnetometer. The magnetometer may detect characteristics of a magnetic field emitted by the syringe 210 to detect the location of the syringe 210. Other sensors may be included and similarly configured to detect emissions from the syringe 210. In an embodiment, the syringe 210 includes one or more sensors, including position sensors, accelerometers, 3D position sensors, orientation sensors, inertial measurement units, pressure sensors, or other sensors useful for determining position, location, orientation, and use characteristics of the syringe 210. The syringe 210 can be equipped with a wired or wireless communication device and can transmit the information to the TCH 200 or to another device that forms part of the injection training system 100. Additional examples of sensors that can be included on the syringe 210 or TCH 200 include antenna to detect radio waves and a microphone to detect sound. Combinations of sensors may be used to provide additional detection capabilities.

The apparatus sensor 206 is coupled to a sensor interface 208, which is illustrated as a vision interface 208 in FIG. 2, housed within the base portion 204. The coupling may include a wired, wireless, or hybrid coupling. In the implementation shown in FIG. 2, the vision interface 208 is configured to transmit and receive information from the sensor 206. The information transmitted to the sensor 206 may include tracking location coordinates (e.g., X, Y, and Z). The information transmitted from the sensor 206 may include one or more of a video feed or other signal indicative of detected light, a sensor position pitch value, a sensor position roll value, a sensor position yaw value, and/or a sensor profile characteristic. The information may be transmitted from the sensor 206 to the vision interface 208.

The TCH 200 shown in FIG. 2 includes a processing unit 250. In some embodiments, by way of non-limiting example, the processing unit 250 may be embedded within the base portion 204. The processing unit 250 may be implemented as an embedded PC or other electronic information processing device (e.g., Raspberry Pi®, Arduino, BeagleBoard, etc.) included in the housing 204. In some implementations, the processing unit 250 may be configured to include specialized circuitry to implement the aspects shown in FIG. 2 and described herein. It may be desirable to configure the processing unit 250, such as via non-transitory, computer-readable media storing software instructions executable by an electronic instruction processing device(s), to implement the described features.

One feature included in the processing unit 250 shown in FIG. 2 is a vision processor 252. The vision processor 252 is configured to exchange messages with the sensor interface 208. While the description that follows is directed to vision information, it will be understood that as other sensors may be included in the TCH 200. Illustratively, additional or alternate sensor processors may be included to similarly handle the sensor information exchanged between the sensor interface 208 and the processing unit 250.

In implementations where the sensor 206 is a camera, the vision processor 252 may receive information about the sensor such as a video feed or other signal indicative of the detection of light and/or camera position (e.g., pitch, roll, yaw, sensor characteristic) or current tracking position information (e.g., X, Y, and/or Z coordinates), or other forms of position information. Example sensor characteristics include sensor type, sensor model number, sensor configuration, and sensor state (e.g., temperature, memory, processor load, etc.). The information is received via the vision interface 208. In some implementations, the vision processor 252 may transmit adjustment information to the sensor 206 via the vision interface 208. For example, the tracking position may need to be adjusted for a particular test or training exercise. The tracking position may need to be adjusted to account for local testing variance (e.g., uneven installation surface, degradation of the TCH 200 over time, ambient lighting, temperature, etc.). The adjustments may be identified, in some implementations, by the vision processor 252 based on one or more of the test or training exercises selected, a calibration sequence, configuration parameters (e.g., physical installation location information such as degrees level), or other inputs to the vision processor 252.

The processing unit 250 includes a processor 260. The processor 260 may be configured to control the operation of one or more elements included in the processing unit 250. For example, the processor 260 may be configured to provide adjustment instructions to the vision processor 252. The processor 260 may operate by executing instructions stored in a memory 262. In some implementations, it may be desirable to configure the processor 260 as an application-specific circuit configured to perform the features described herein. The memory 262 may also be configured to store information such as the information received from the vision processor 252. This information may be transmitted via a network input-output (I/O) interface 258. The network I/O interface 258 may be configured to generate and receive messages over a network such as the network 104 shown in FIG. 1. Messages may also be exchanged with the syringe 210 or a local display device 106 via the local display device I/O interface 256. In some embodiments, messages may be exchanged with the syringe 210 or a local display device 106 via the network I/O interface 258. The local display device I/O interface 256 may generate and receive messages from a local display device 106 such as the local display device 106 shown in FIG. 1.

Various elements of the processing unit 250 may be coupled by a bus system 264. The bus system 264 may include a data bus, for example, as well as a power bus, a control signal bus, and a status signal bus. The bus system 264 is one example of a means for coupling the components of the processing unit 250. As such, the components of the processing unit 250 may be coupled together or accept or provide inputs to each other using an alternative exchange mechanism.

The processing unit 250 may also receive information from the a sensor interface, depicted in FIG. 2 as a syringe interface 212, via a syringe processor 254 included in the housing 204 of the TCH 200. The syringe interface 212 may be configured to exchange messages with the syringe 210. Messages may be received in real-time such that the characteristics the syringe 210 may be tracked during a test or training exercise. The syringe 210 may be configured for wired, wireless, or hybrid communication with the syringe interface 212. For example, it may be desirable to utilize a wireless communication technology such as Bluetooth® for syringe 210 communications.

Messages transmitted to the syringe 210 may specify an injection resistance profile, and/or an injection speed profile, and/or an injection location profile. These profiles may be used to configure the syringe 210 to provide realistic performance during a test. For example, one injectable fluid may have different characteristics than another such as viscosity. The difference in viscosity can provide a different experience during the injection process. To ensure the test is as realistic as possible, the resistance profile may be adjusted to reflect the varying viscosity depending on the test or training exercise being performed.

Information received from the syringe 210 identifies the state of the syringe 210 during a training exercise or test. The information may include the color of fiber optic illumination, the intensity of fiber optic illumination, the plunger base physical resistance, and the plunger travel limit. The plunger base physical resistance can provide a value indicating the standard resistance for the syringe 210. The plunger travel limit information provides information indicating the degree to which the plunger on the syringe 210 has been depressed. This information can be used to calculate an amount of injectable fluid delivered by the injection.

The syringe interface 212 may provide this information to the syringe processor 254. The syringe processor 254 may store the syringe information in the memory 262. The syringe processor 254 may also be configured to provide information to the syringe 210 via the syringe interface 212. As with the vision processor 252, the syringe processor 254 may adjust the parameters for the syringe 210 based on a test or training exercise being performed, or to account for changes in the testing apparatus over time (e.g., degradation, environmental adjustments, and the like).

It may be desirable, in some implementations, to provide vision information and/or syringe information to the local display device 106 via the local display device I/O 256. The processor 260 may be configured to perform analytics on the vision and syringe data to provide test or training exercise result information. For example, the processor 260 may obtain a test template for a given injectable and site. The test template can provide expected injection location information and syringe 210 injection characteristics, such as quantity, speed, and location. The processor 260 may compare the test or training information with the template to determine how closely the trainee has matched the template.

In some implementations, the local display device I/O 256 may be implemented as a webpage. In such an implementation, the local display device I/O 256 may be an embedded Web server configured to generate HTML or other machine readable documents for transmission to the local display device 110. The local display device I/O 256 may also receive messages from the local display device 110. For example, the local display device 110 may be configured to monitor more than one TCH 200. In such implementations, the local display device 110 may transmit a TCH identifier via the local display device I/O 256 and receive information for the activity at the identified TCH. The local display device 110 may also provide messages about an ongoing test or training exercise as described above. The received information may be stored in the memory 262.

The network I/O 258 may be configured to transmit test or training information to the training server 108. As communication with the training server 108 is over the network 104, the time and resources which may be consumed in providing the test or training information to the training server 108 may be greater than the resources needed to communicate with a local display device. Accordingly, the processing unit 250 may be configured to delay transmission of the test or training information from the memory 262 to the training server 108 until the end of a training or testing session. In some implementations, the processing unit 250 may be configured to transmit the information to the training server 108 based on a schedule. For example, it may be desirable to transmit training or test information to the training server 108 during a period of time when the training center is closed. At such a time, standard business network traffic may be at a minimum, thereby enhancing the efficiency of the transmission from the processing unit 250 to the training server 108. Another factor which may be used for determining the transmission time is the amount of storage space available in the memory 262. When a threshold usage amount is reached, the processing unit 250 may prepare to transmit data to the training server 108 at the next available opportunity.

One non-limiting advantage of the described features includes the ability to replace the training portion 202 without needing to replace the housing 204. This can provide the ability for reconfiguring the sensor 206 and syringe processor 254 within the housing 204 to accommodate different training portion configurations. This can be particularly cost-effective when a training center provides different testing and/or training to a variety of clients. The processing unit 250 may be reconfigured for a new training portion 202, thereby reducing the amount of setup needed to service a new training.

Another non-limiting advantage of the described features includes the ability to adjust the training or testing for a given TCH 200 from the training server 108. For example, a trainee may be assigned to a TCH 200. The trainee currently using the TCH 200 may be identified to the training server 108. Based on the identified trainee, the training server 108 may provide one or more training modules which the trainee is authorized to access. In this way, the processing unit 250 need only obtain the training information to which the currently logged-in trainee has access. This can reduce the processing and/or memory requirements to support multi-client training centers.

A further non-limiting advantage of the described features is to support the monitoring adjustment of the TCH 200 over time. Degradation in performance of the TCH 200, sensor 206, or the syringe 210 may be identified by analyzing the training or testing information transmitted from the TCH 200 to the training server 108. For example, trainee information for a given test may consistently exhibit common deviation from the expect test result. This may indicate a defect in the training and certification head 200. The number of tests performed may also be used to identify when the syringe 210 or training portion 202 may need maintenance and/or replacement. Hardware typically exhibits a predictable degradation over time based on expected use. Using this information, a TCH 200 which may be nearing end-of-life and/or requiring maintenance can be identified, such as by the training server 108.

Figure 3:
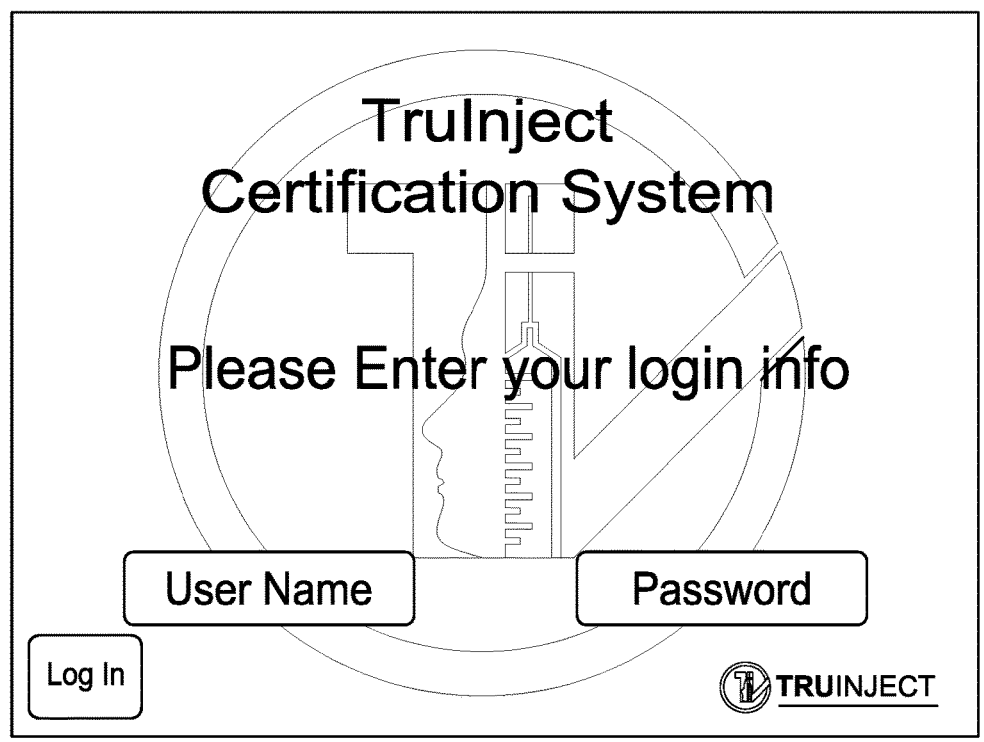
FIGS. 3-14 illustrate example displays which may be included in an embodiment of the disclosed injection training systems, methods, devices, and non-transitory computer-readable media.

FIGS. 3-14 illustrate example embodiments of displays which may be included in an injection training system 100. FIG. 3 shows an embodiment of a login interface which may be used by a trainee to access the injection training system 100. As shown, a login includes a username and password field. In some implementations, the login process may include biometric information such as a fingerprint or retinal scan to help verify the identity of the trainee. Biometric identifiers are the distinctive, measurable characteristics used to label and describe individuals. Biometric identifiers can be categorized as physiological characteristics related to the shape or structure of the body. Examples of biometric identifiers include, without limitation, fingerprint, palm veins, facial image, DNA, palm print, hand geometry, voice print, iris, retina, and odor/scent. Behavioral characteristics, which may also be used to authenticate a user, are related to the pattern of behavior of a person, including without limitation, typing rhythm, gait, and voice. Some researchers have coined the term "behaviometrics" to describe the behavior-related class of biometrics.

Figure 4:
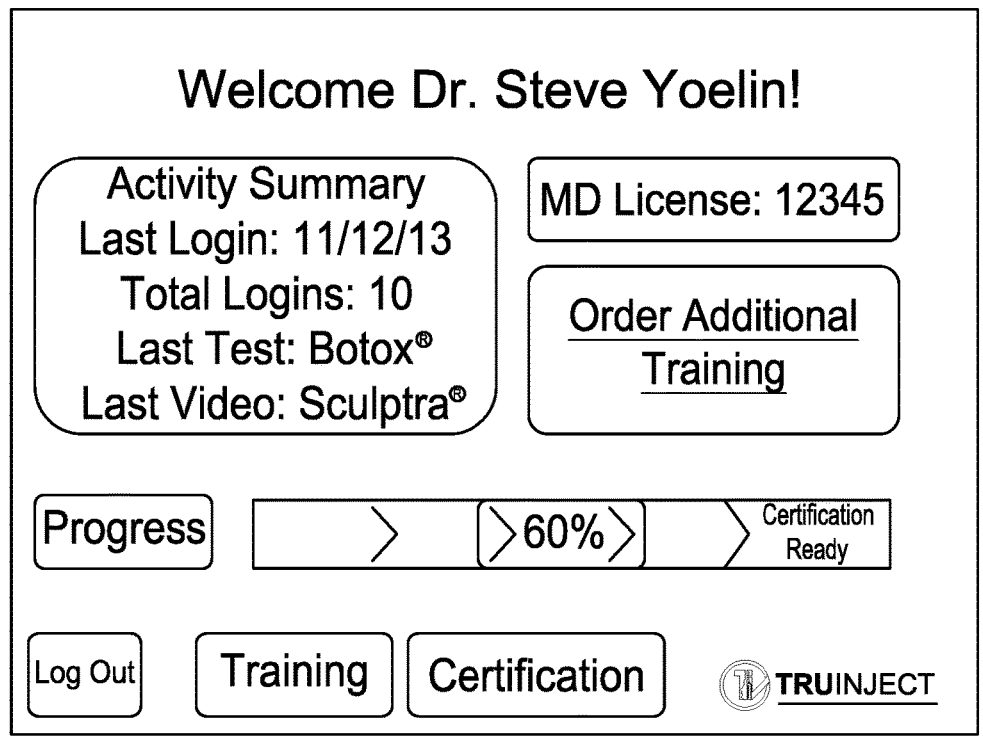

FIG. 4 illustrates an embodiment of a personalized profile page for a client. The personalized page may collect information about the trainee, such as activity summary, medical licensing, progress toward certification, and the like. Interface elements may be included which transmit signals requesting additional training, to perform existing training, to perform certification, or to log out.

Figure 5:
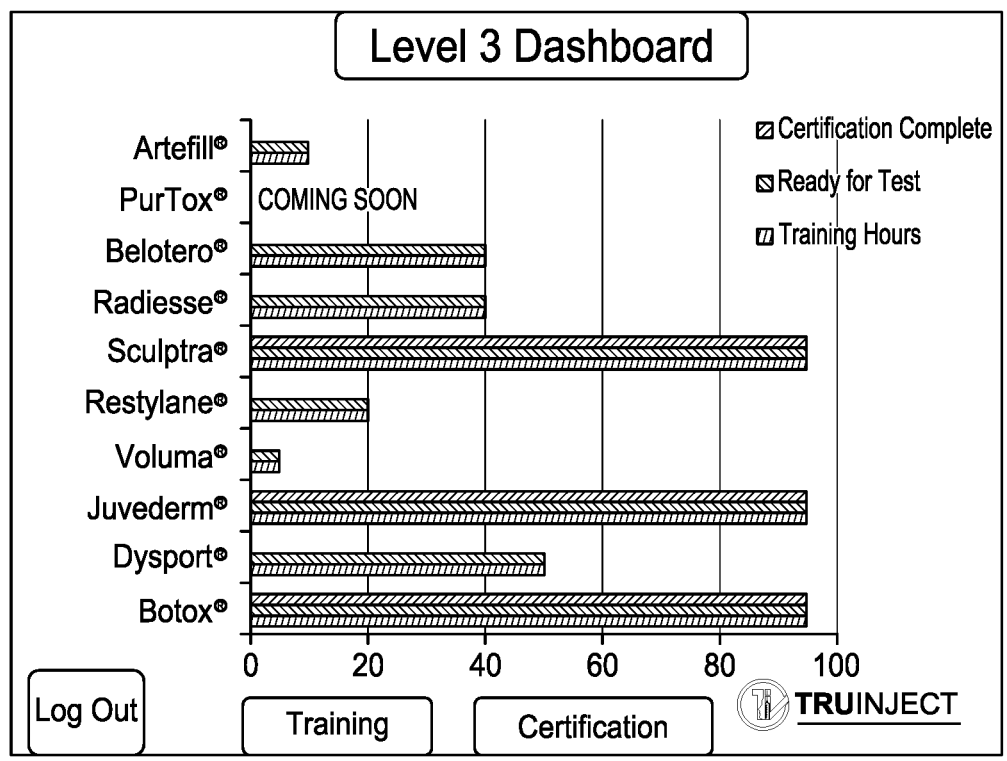

FIG. 5 shows an embodiment of a progress dashboard which may be included in the training certification system. The progress dashboard illustrates one way in which such information may be represented. The information shown includes a product and the number of hours trained on a given product. For each product, an indication may be provided as to whether the certification has been completed and/or whether the trainee is ready to test for the certification.

Figure 6:
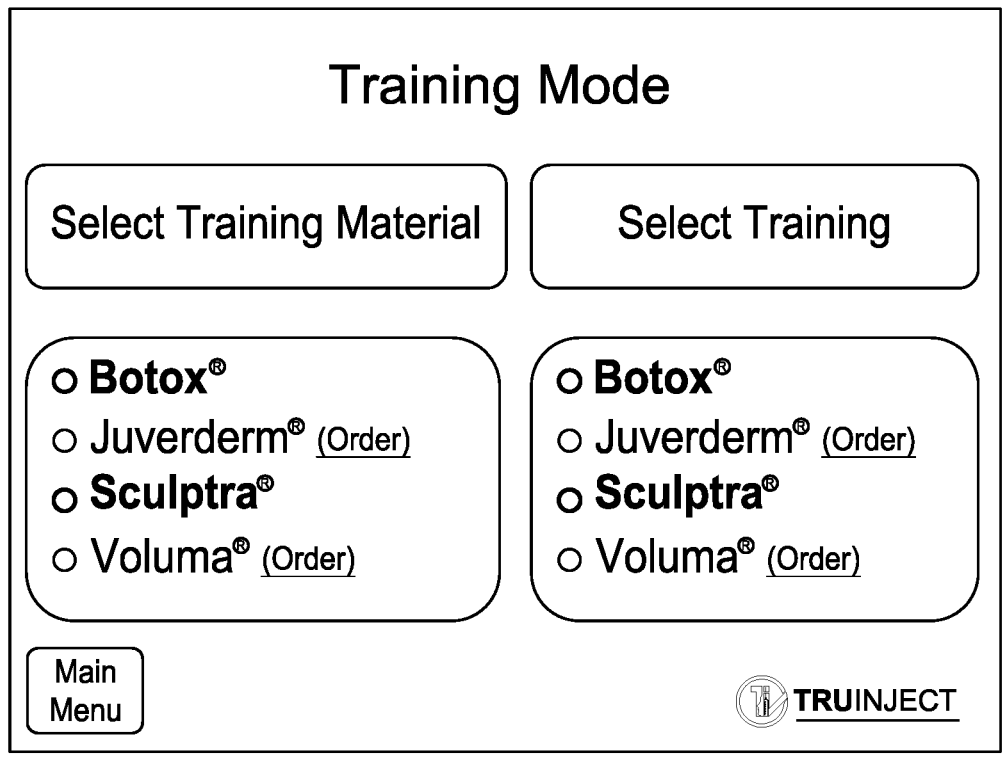
Figure 7:
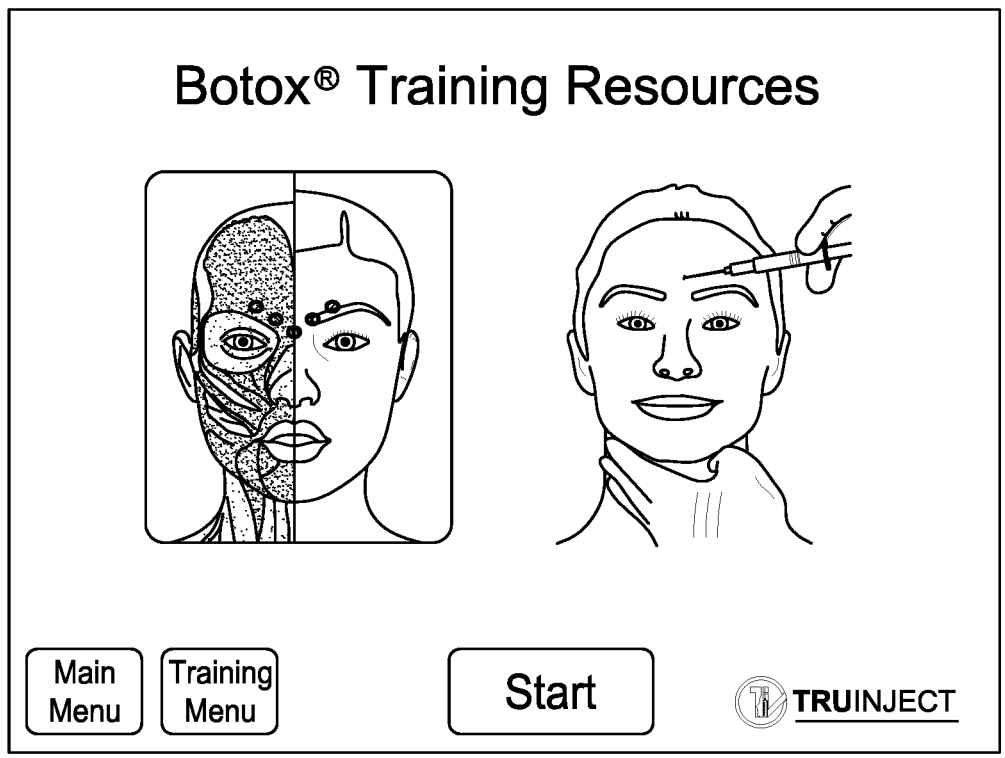
Figure 8:
Figure 9:

FIG. 6 shows an embodiment of a training mode interface which may be used to perform training. A given trainee may not have access to all the training materials available through the system. As shown in FIG. 6, an interface element may be included to receive a request to order trainings to which the trainee has not yet been authorized. FIG. 7 is an embodiment that illustrates training resources for a product. The training resources may include audio, visual, multimedia, textual, and haptic materials to help the trainee learn the techniques to qualify for and pass the certification. FIG. 8 is an embodiment that shows the available training for a particular location and product. As shown in FIG. 8, there is Botox® training available for the location of crow's feet. The training may include one or more tests. As shown in FIG. 8, the trainee has not performed any tests based on the absence of scores for each test. FIG. 9 is an embodiment that shows the available training for a particular location in product after a trainee has performed the tests. Each test has an associated score expressed in this example as a percent. For the trainee data shown in FIG. 9, it appears the trainee has improved over time as the test score associated with the first test is 50% while the test score associated with the last test score is 90%.

Figure 10:

The system may be configured to aggregate and analyze test results. FIG. 10 is an embodiment that provides training results for the trainee scores illustrated in FIG. 9. One analytic measure which may be provided is an average score. Another example of an analytic provided is a standard error which was identified in the trainee's performance. As shown in FIG. 10, the trainee needs to focus on needle placement. Aside from simply identifying a weakness with the trainee, the system may also provide suggested training materials to correct the weakness. As shown in FIG. 10, a recommended training is provided. Suggestions can be predetermined (e.g., curricula based) or determined by the system over time based on an analysis of the training data. For example, the system may determine that trainees who participate with a given training module exhibit a higher proficiency during testing than those who have not participated in the module.

Figure 11:

A trainee may become eligible for certification for a given product. Illustratively, certification eligibility may be based on, for example, payment of a fee or, as another example, a number of training hours completed. As shown in the embodiment of FIG. 11, the trainee may select certification tests from the list. As shown, the trainee is eligible to perform certification for Botox®. The trainee may order additional certifications for which the trainee is eligible. When the trainee has not yet met the eligibility requirements for a particular product and/or procedure, the trainee will not be permitted to order or perform the certification test.

Figure 12:

FIG. 12 is an embodiment that shows a certification test menu interface. The interface includes a list of injection sites and corresponding controls to initiate the test for the specified injection site. In some implementations, simply activating the control to begin the test will initiate the certification test. In some implementations, it may be desirable to further identify or authenticate the trainee prior to initiating the test to ensure no cheating is occurring. A further identification authentication may include biometric identification, for out-of-band identification by an operator of the local display device 110. To help verify the identity of the trainee, other identification authentication mechanisms may be used; such authentication mechanisms are understood and known by those in the relevant fields of endeavor.

Figure 13:
Figure 14:
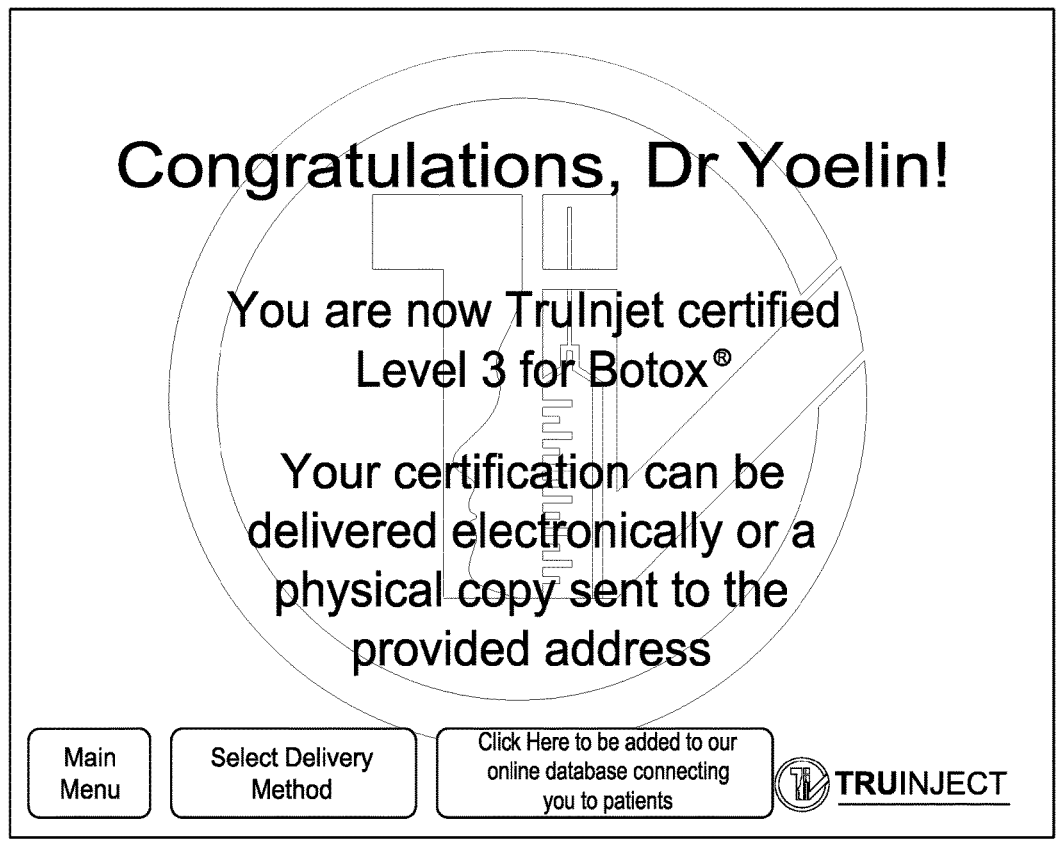

FIG. 13 is an embodiment that provides a certification test result list. Illustratively, the training server 108 may analyze the test information and provide a determination as to whether the trainee has achieved certification. In some implementations, the injection training system 100 provides levels of certification. FIG. 14 is an embodiment that shows a certification interface for a trainee who has successfully completed a level 3 training for Botox®.

The certification information may be delivered in a variety of ways. One delivery method may be to provide a mailed certificate to the trainee's address as provided during the registration process. One delivery method may be to provide the certification information to an insurance provider on behalf of the trainee. This may be useful in helping insurers identify appropriate reimbursement rates for procedures performed by clinicians, as well as to calculate premiums for the provider. The certification information delivery method may be via one or more social media platforms such as Foursquare® or Facebook® or Yelp®. In such implementations, the trainee may provide account information to which the certification may be published upon successful completion. In an embodiment, the certification interface shown in FIG. 14 may include a control to cause the trainee to be added to a directory of certified providers. This can provide further incentive for trainees to complete certifications, as inclusion in the directory may be a valuable form of advertising for their services and skills.

Figure 15:
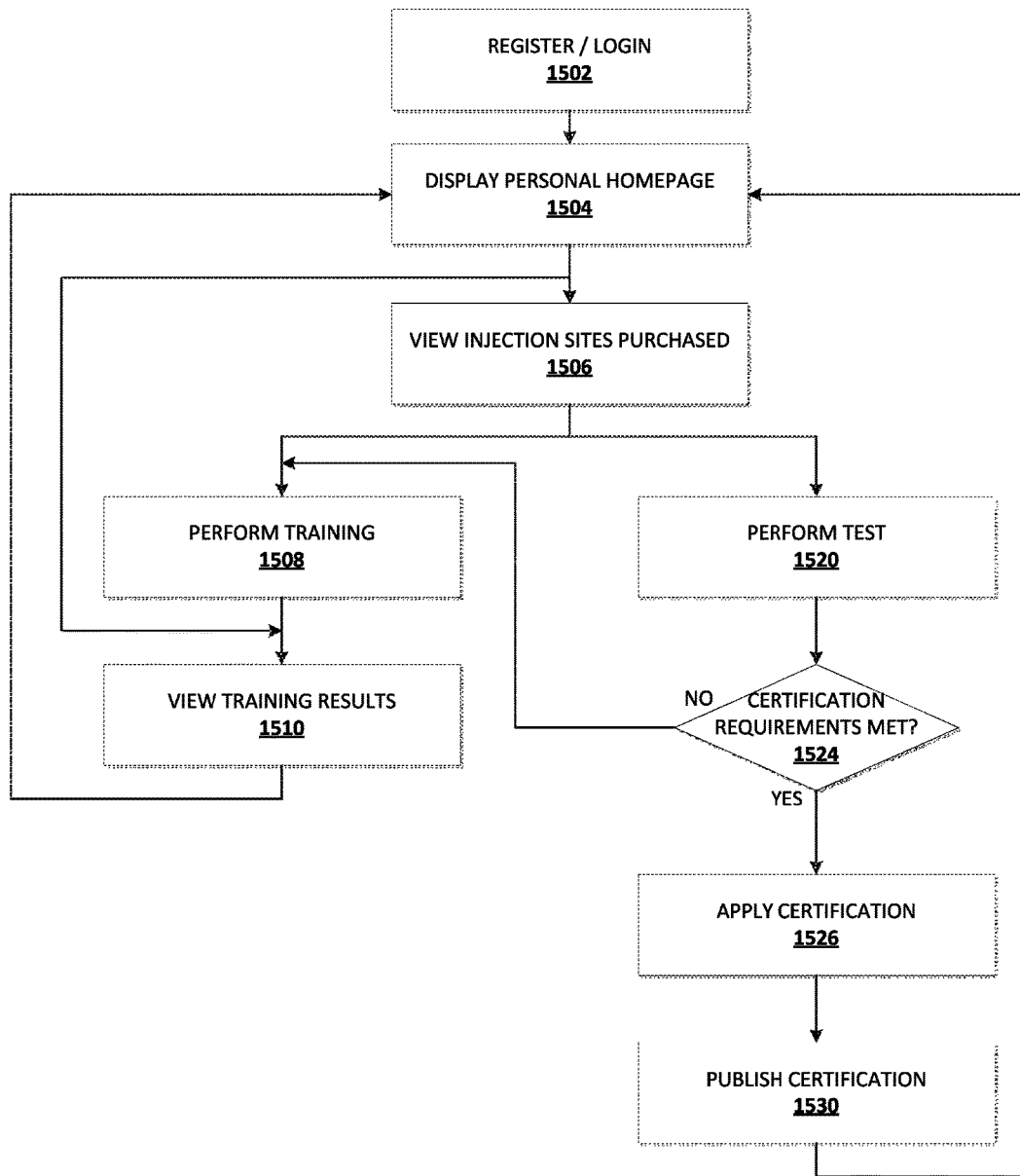
FIG. 15 shows a process flow diagram for a method of providing injection training according to an embodiment of the present disclosure.

FIG. 15 is a process flow diagram for a method of providing injection training according to an embodiment of the present disclosure. The method shown in FIG. 15 may be performed in one or more of the devices shown herein. For example, the training server 108 may be configured to perform the method shown.

The method begins at node 1502 where a user is registered and then logs in. The registration process may include collecting information about the trainee such as address, name, password, and the like. Registration information may include, by way of non-limiting example, name, license number, city, state, zip code, phone number, products used, and biometric sensor used to verify the trainee's identity. Additional information about the trainee's practice may be included such as types and/or how many injections per week/patients per week. Background information about the trainee such as area(s) of concern/training need, number of years injecting, and school attended may be obtained. The registration may also include legal information such as a user agreement including information about data capture and privacy. The registration system may be configured to capture an electronic signature indicating acceptance of the usage and data terms.

The login process, at node 1502, may include receiving one or more of the following: biometric sensor or camera information to identify trainee; MD license/RN license data; user name; or password. The process at node 1502 may authenticate a user's fingerprint by using a scanner connected to the processing unit 250 after the user has successfully entered user name and password. The login process, at node 1502, can include authentication of the license number of the user via interaction of the training server 108 with the processing unit 250. Since the data needed is available on the processing unit 250, maintaining a network connection to the training server 108 is not necessary at this point. A connection may be established when the trainee or a facility employee is trying to add a new training or certification area for the trainee at the time the training server 108 is not available.

It may be desirable to require fingerprint or other biometric verification for each trainee interaction with the training server. In such implementations, a communications link would be maintained, via the processing unit 250, with the training server 108 for interactions through the training and certification head 200. If the trainee or other user desires to access the training server 108 away from the training and certification head 200, the biometric (e.g., fingerprint) identification may be received via a different biometric reader. Illustratively, the trainee (or trainee representative) may wish to access the training server 108 to purchase additional injection-training regions, to review training history, to mentor, or to authorize review of trainee status from locations remote from the training and certification head 200. In some implementations, features may be selectively configured for access with biometric information based on the feature, user, groups, or other permissions. For example, a trainee may wish to require biometric authentication for all interactions with his or her data on the training server. In other implementations, it may be required, such as by law or by a licensing entity, to protect certain information with biometrics. Accordingly, features which include such data may be protected, while other features made accessible without the need for biometric security provisions.

After successful login, authentication of the license number of the user, and/or biometric evaluation, a personal homepage will be displayed at node 1504. The personal homepage is dynamically generated to provide current information tailored to the logged-in user. The information may include a training tip selected based on the user's performance during a recent training exercise. The information may include a new test or certification that has become available, selected based on the user's previous tests, certifications, or indicated area of concern/training need. The homepage may also include navigation controls to other features such as training analysis, training and certification history, training resources, training and certifications, settings, informational content, injection training web resources, frequently asked questions, and the like.

The features related to training may include training educational resources, drug selection tools and information, training progress and results, current scores, ranking (e.g., where this trainee stands relative to others nationally/regionally/locally/or by affinity group (e.g., same school)), injection technique (e.g., ninja versus white belt), training session time, real-time display of current needle proximity to target position and real-time feedback, and available trainings that need to be taken or can be taken by the trainee. Ancillary training resources, such as tutorials and video demonstrations, may be included in the system and provided to the trainee based on historical and/or demographic information associated with the trainee.

One example of a training resource is representational information for the training site. In the example of a face, the representational information includes human face content, such as anatomical information, animation of facial functions (e.g., muscle movement), and a computer-aided drawing detailing various structures and structural layers of the face. Analogous representational information of other human, non-human, or inanimate objects may be provided to a trainee to allow that trainee to understand the behavior of the training site being used.

Certification functionality may include features that allow the trainee to select and/or take a particular test. Illustratively, the test may be related to a particular drug. The certification functionality may include a listing of all available certifications and the option to purchase new certifications. The certification functionality can also include a display of certification results for the logged-in user.

The system may be configured to maintain historical information to allow tracking of activity and progress over time. The historical information may include, by way of non-limiting example, training date and time, session time, certifications, rankings, type of trainings taken, and captured data including: time, position, proximity, pressure for a test/training, geographical location (locator) information, maximum session score, maximum training purchased, and maximum injections available.

At node 1506, injection sites purchased are presented. The injection sites represent modules of injection training available to the logged-in user. The injection sites may be provided upon receipt of payment. The injection sites may be provided for a limited period of time.

The injection training system 100 may receive a message including an identifier for an injection site and a request for training. Such a message causes, at node 1508, training to be performed for the requested injection site. The training may include anatomy training, viewing content, taking a quiz, or performing an exercise on a training and certification head 200. The training may further provide feedback on the training such as a score at node 1510. If performed on the training and certification head 200, the training information may be stored by the processing unit 250 and transmitted at a later point in time to the training server 108.

Once completed, the process may return to node 1504 to display the personal homepage as described above.

Returning to node 1506, a message may be received identifying an injection site and the desire to perform a test (e.g., a certification test). At node 1520, the test is performed. Performing the test may include further biometric identification at the training and certification head 200 to ensure the user is correctly associated with the certification test. Performing the test may include providing an exercise (e.g., drug and injection site) and waiting for data from the training and certification head 200 corresponding to performance of the exercise. At decision node 1524, the processing unit 250 may receive the test data and compare it to an ideal test result to determine whether certification criteria are met. Such comparison can be performed by numerical and/or statistical analytical methods. The criteria may vary based on the drug and/or injection site. Illustratively, one non-limiting example criterion can be the degree to which the received test data matches the ideal test result. If the degree is below a threshold level, the trainee may not be given the certification. The certification criteria may also include an amount of time of training, a number of training exercises, or other information for the trainee (e.g., license number, insurance number).

If it is determined, at decision node 1524, that the trainee has not met the certification requirements, the process may continue to node 1508, as described above, to provide additional training. The additional training may be tailored to the specific shortcomings with the most recent certification attempt. In some implementations, the process may return to node 1504 to display the trainee's personalized homepage, as described above.

If it is determined, at decision node 1524, that the trainee has met the certification requirements, then at node 1526, the certification is applied for on behalf of the trainee. The application of a certification can include creating a record in the data store 112 indicating the trainee's qualification for the certification, along with a date of certification.

The process shown in FIG. 15 may continue to node 1530 where the certification is published. Publication can include transmitting the certification information to an insurance carrier, including the trainee on a public list of certified providers, and/or posting certification to a social media service such as Foursquare®, Facebook®, or Yelp®. Transmitting the certification information may be accomplished via an electronic medium such as email, fax, web service, or the like. Transmitting the certification information may also include us of a physical medium, such as mail or other courier services, in conjunction with physical production of the certification (e.g., print on demand, print to order, or batch print fulfillment).

Once the certification is published, the process may return to node 1504, as described above.

Figure 16:
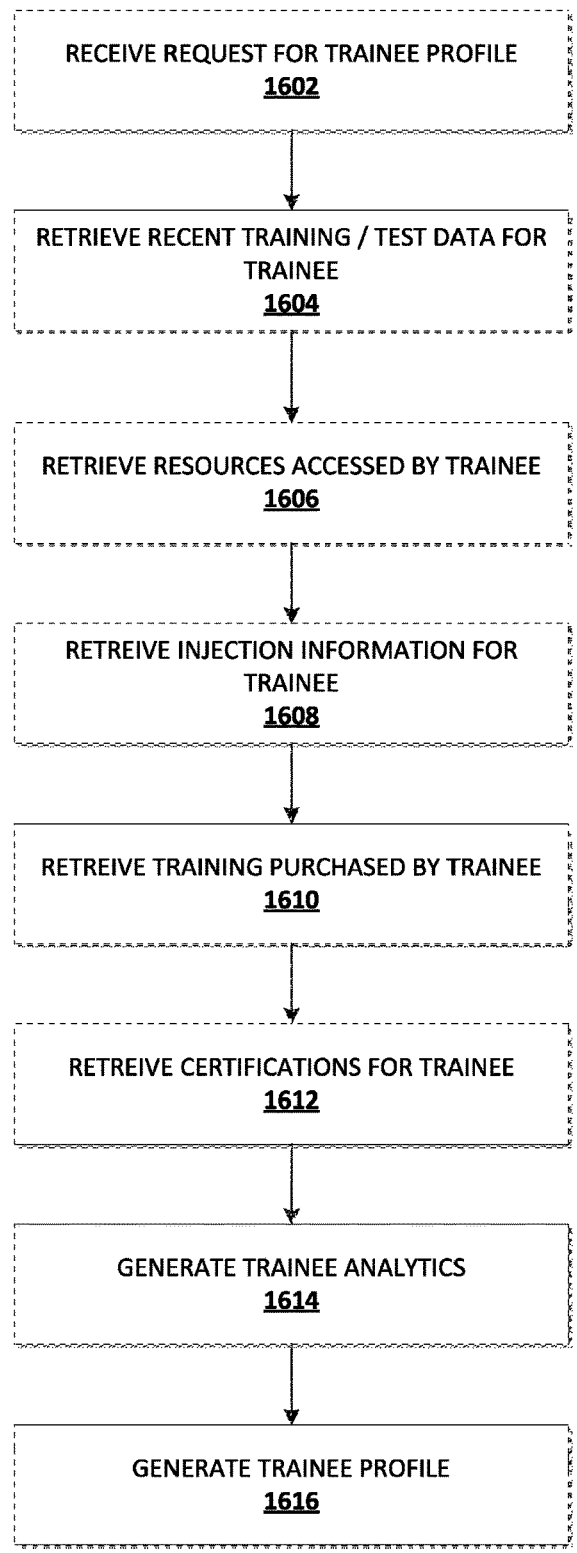
FIG. 16 shows a process flow diagram for a method of generating a trainee profile according to an embodiment of the present disclosure.

FIG. 16 shows a process flow diagram for a method of generating a trainee profile according to an embodiment of the present disclosure. The method shown in FIG. 16 may be implemented in whole or in part by one or more of the devices described above, such as the training server 108.

At node 1602, a request for a trainee profile is received. The request includes an identification of a trainee for which the profile is to be generated. In some implementations, this identification information may be obtained from a session established upon the trainee's login to the system. In some implementations, the request may be generated by a local display device 106 upon selection of a trainee to supervise. For example, the local display device 106 may provide an interface listing the trainees at a particular training center. The local display device 106 may receive an indication of one trainee of interest and transmit this to the server 108 for generating a profile.

At node 1604, recent training and/or test data for the trainee is retrieved. The recent data may be training or test data uploaded from one or more training and certification heads 200, from the data store 112, or based on the information received in the request at node 1602. The retrieval may be further based on a system configuration indicating the period of time defining "recent." For example, in one implementation, recent data may be identified as data collected within a number of weeks, while in other implementations the recent data may be identified as data collected within a number of hours, months, years, or other measures of time. The configuration may further define a maximum number of records to retrieve.

At node 1606, resources accessed by the trainee are retrieved. The resources may include training resources, certification resources, general information resources, or any other data provided by or through the injection training system 100.

At node 1608, injection information for the trainee is obtained. Examples of the training injection information can include the number of injections performed by the trainee and the injection sites on which the trainee has trained. The injection information may comprise training or test data uploaded from one or more training and certification heads 200. The injection information may be obtained from the data store 112 and/or the memory 262.

At node 1610, training purchased by the identified trainee is retrieved. The training may be retrieved from the data store 112. In some implementations, information about a training module is retrieved rather than the training content. The information about the training may include identification information that may be used, such as by a processing unit 250, to obtain the training content for a training and certification head 200. In some implementations, this information about a training module may be referred to as training metadata.

At node 1612, certifications for the identified trainee are retrieved. The certification information may include certifications obtained, certifications attempted but not successfully obtained, certifications available for the trainee to take, and/or certifications which may be accessed upon satisfaction of one or more conditions (e.g., payment or completion of required training).

At node 1614, analytics may be generated for the identified trainee. The analytics may be based on the retrieved information. The analytics can include obtaining aggregated information for other trainees and comparing the aggregated information to the trainee's information. The analytics may identify training resources to improve one or more aspect of the trainee's injection technique. The identification may be based on available training resources, training metadata, injection information, and recent training and/or test data, to name a few.

At node 1616, the trainee profile is generated. The trainee profile may be generated in a computer-readable format such as hypertext markup language, extensible markup language, or another structured or semi-structured machine-readable format. In some implementations, generation of the trainee's profile at node 1616 may include providing a display interface including the trainee profile. The profile may include the retrieved information from, for example, the data store 112. The profile may include processed versions of the retrieved information. The processing may include selectively including one or more information elements, including elements in a particular order (e.g., priority ranking). The analytics may also be included in the trainee profile. In some implementations, the trainee profile may be used to generate a personal homepage for the trainee.

Figure 17:
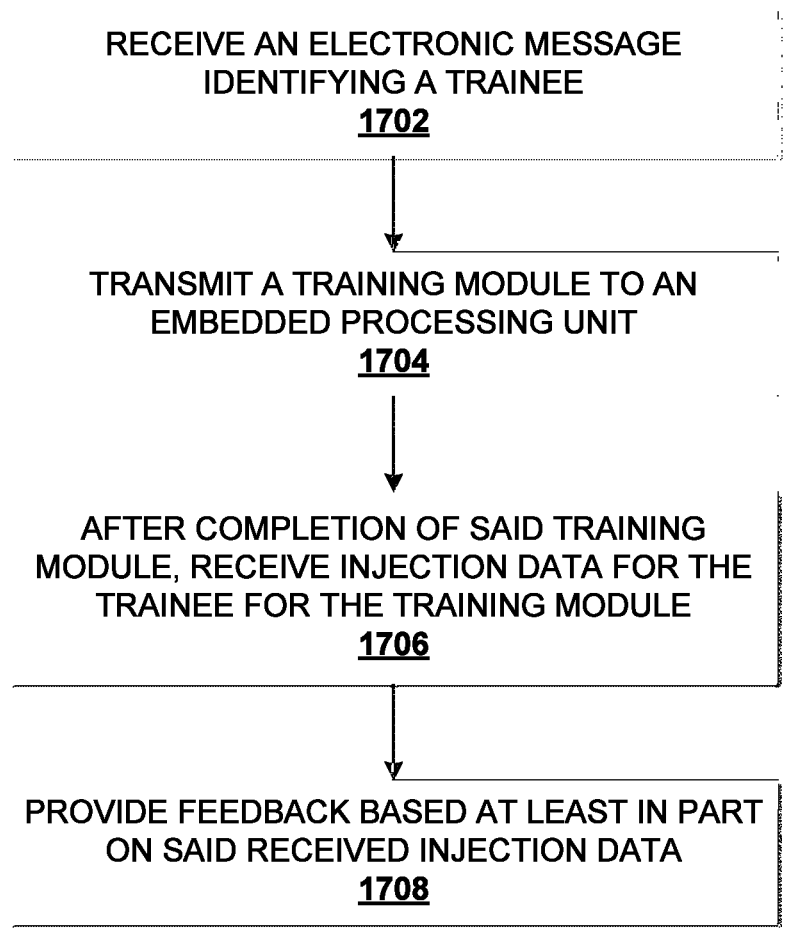
FIG. 17 shows a process flow diagram for a method of providing injection training according to an embodiment of the present disclosure.

FIG. 17 shows a process flow diagram for a method of injection training. The method may be implemented in whole or in part using one or more of the devices described above, such as the training server 108.

At node 1702, an electronic message identifying a trainee is received. The message may include a trainee identifier or identifying information such as a name or license number.

At node 1704, a training module is transmitted to a processing unit 250. The training module identifies a target injection profile for specified injection site and injectable substance. The target injection profile represents the ideal or "perfect" injection for the selected site and substance.

At node 1706, after completion of said training module, injection data for the trainee for the training module is received. The injection data identifies one or more characteristic of a syringe 210 during the training. Characteristics may include location, depth, pressure, plunger location, time, speed, and the like. The characteristics may be received from the syringe 210, from one or more sensors 206, and/or from a processing unit 250. The injection data is associated with a training apparatus 200 upon which said training module was performed. In some implementations, this may include providing a device identifier for the training apparatus 200.

At node 1708, feedback is provided based at least in part on said received injection data. The feedback may be targeted to the trainee and may include an indication of certification status, training status, additional training resources, or the like. The feedback for a trainee may take the form of a trainee profile as described above. In some implementations, the feedback may include feedback targeted to the training apparatus. For example, the feedback may identify maintenance needed for the training apparatus 200 (e.g., training portion 202, syringe 210, processing unit 250, etc.).

The disclosed injection training system 100 provides the capability to monitor and evaluate injection training activity in a manner that exceeds the level of instruction and performance evaluation offered by traditional injection training practices and environments. In particular, the injection training system 100 collects data that can be used to analyze various aspects of the trainee's performance, both during the injection training session and after the session is completed. Illustratively, the injection training system 100 senses, displays, and records the position and orientation of the syringe 210, including the syringe needle, relative to the training apparatus 200 during the delivery of the training injection. Metrics are collected by the injection training system 100 during training injections to monitor, evaluate, and assess various aspects of the injection performed by the trainee. Some such metrics, by way of non-limiting example, include a description of the dynamic motion of the syringe, including position and orientation information of the syringe and the syringe needle relative to the training apparatus throughout the training injection; the angle of approach of the syringe needle relative to the training apparatus; the angle of entry of the syringe needle into the training apparatus; the depth of penetration of the needle within the training apparatus; the amount of force applied by the syringe to the training apparatus; the amount of therapeutic agent delivered (either by simulation of delivery or by actual delivery) to the training apparatus; the dynamic description of displacement of the syringe plunger during the training injection; the amount of force applied to the syringe plunger during the training injection; the rate of flow of the therapeutic agent delivered (either by simulation or by actual delivery) to the training apparatus; the proximity of the delivered injection relative to the target injection site; and the anatomical structures affected by the training injection.

By processing the collected metrics, the disclosed injection training system 100 can present, on for example, the display device 106, a computer-generated graphical depiction of the training injection. The injection training system 100 possesses a digital model of the training apparatus 200 based on information corresponding to the anatomical structure represented by the training apparatus 200. By way of non-limiting example, the digital model can include target tissue (individual muscles) and details of vital structures (which may also be referred to as vital tissue) such as, for example, arteries, veins, nerves, and skeletal portions, that are to be avoided or accommodated during the training injection. The display device 106 can graphically present, during the injection training and afterwards, the location of the needle tip relative to the training apparatus 200 as the needle tip penetrates the training apparatus 200. The display device 106 illustrates portions of the anatomy in the vicinity of the desired injection site. In particular, vital tissue and muscle are represented digitally on the display device 106. Advantageously, the user can view a target site, a proximity to the target site, and nearby vital tissues or structures. In some embodiments, visual and/or aural signals are delivered to the trainee as indications of the needle tip's proximity to the target site. For example, a target indicator may be displayed to graphically illustrate the needle's present location relative to the target location. Similarly, a tone pitch or frequency of utterance, or other such characteristic can change in response the needle's position relative to the target location, thereby providing target acquisition feedback to the trainee without requiring the trainee to view the display device 106. In another embodiment of the present disclosure, a visible display, a light, or a tactile sensor can be provide on the syringe 210 to provide such indication. During an injection the display device 106 can graphically illustrate the different anatomical skin and tissue layers as the needle tip penetrates each layer. For example, this can be accomplished by graphically revealing different anatomical layers as the layers are penetrated by the needle. The different anatomical layers can be labeled or provided with different textures or colors to indicate a new layer is shown. In an embodiment, the trainee can navigate between the graphical representations of the different anatomical layers as desired.

The real-time graphical depiction of the training injection, as presented on the display device 106, provides information to help the trainee effectively deliver the desired injection. Illustratively, the trainee may alter the view of the graphical depiction to provide different perspectives of the training injection as it is being performed. The trainee may select views that depict different layers or portions of the anatomy. For example, the trainee might select to view on the display device 106 vital structures that must be avoided. Additionally, the trainee can zoom in, zoom out, and rotate the view of the graphical depiction to better visualize the injection as it is being performed or afterwards. By comparing the position of the syringe needle tip, based on the determined position and orientation of the syringe, to the target tissues and the vital structures illustrated on the display device, proximity to a desired injection target can be established. This proximity to the desired target and to vital structures can serve as the basis for evaluating the skill of the injection trainee.

The disclosed injection training system captures and stores the information collected during injection training sessions for subsequent review, evaluation and analysis. Such information includes the recorded position and orientation information associated with the dynamic motion of the syringe, relative to the training apparatus, during training injections. Additionally, processed information associated with a training session may be stored for subsequent review, evaluation and analysis. In an embodiment, the training session information is stored, in aggregate, on the data store 112 and is accessible by the training server 108 to perform analytics on the aggregated data. Illustratively, by way of non-limiting example, types of information that may be accessed by the training server 108 and maintained in the data store 112 include: training date and time; location;

trainee; authorization code; session time; maximum score; maximum ranking within a group (national, region, city, affinity); injection time; amount of pressure applied to the syringe 210; track of the needle tip during injection; in which muscle, nerve, or artery the syringe 210 is injected; pass/fail rates; percentage of injections versus other trainees; number of times a particular piece (or combination of pieces) of training equipment has been used for an injection; behavior of trainee "using" the syringe 210; report feedback on the trainee's performance as compared to an expert in the field (e.g., the Dr. Jean Carruthers technique); and how this trainee "injects" versus others who have undergone the same training.

The training server 108 can be configured to analyze the aggregated training information to identify, among other things, patterns reflective of behaviors among the various trainees. Illustratively, by way of non-limiting example, data can be mined for trainee performance characteristics, including correlation between injection behavior and injection performance, correlation between training materials completed and injection performance, correlation between training location and injection performance, correlation between trainee's education level and injection performance, correlation between the amount of time taken to compete training materials and injection performance, to name a few. Additionally, the data can be analyzed to identify the training sequences and injection techniques that are used by the highest performing trainees. Such analysis can be used to modify training materials and/or training sequences to improve overall performance of trainees who used the injection training system 100. The aggregated data may also be mined to identify training equipment in need of maintenance or replacing. The data may be mined further to identify effective training resources and/or training centers.

Figure 18:
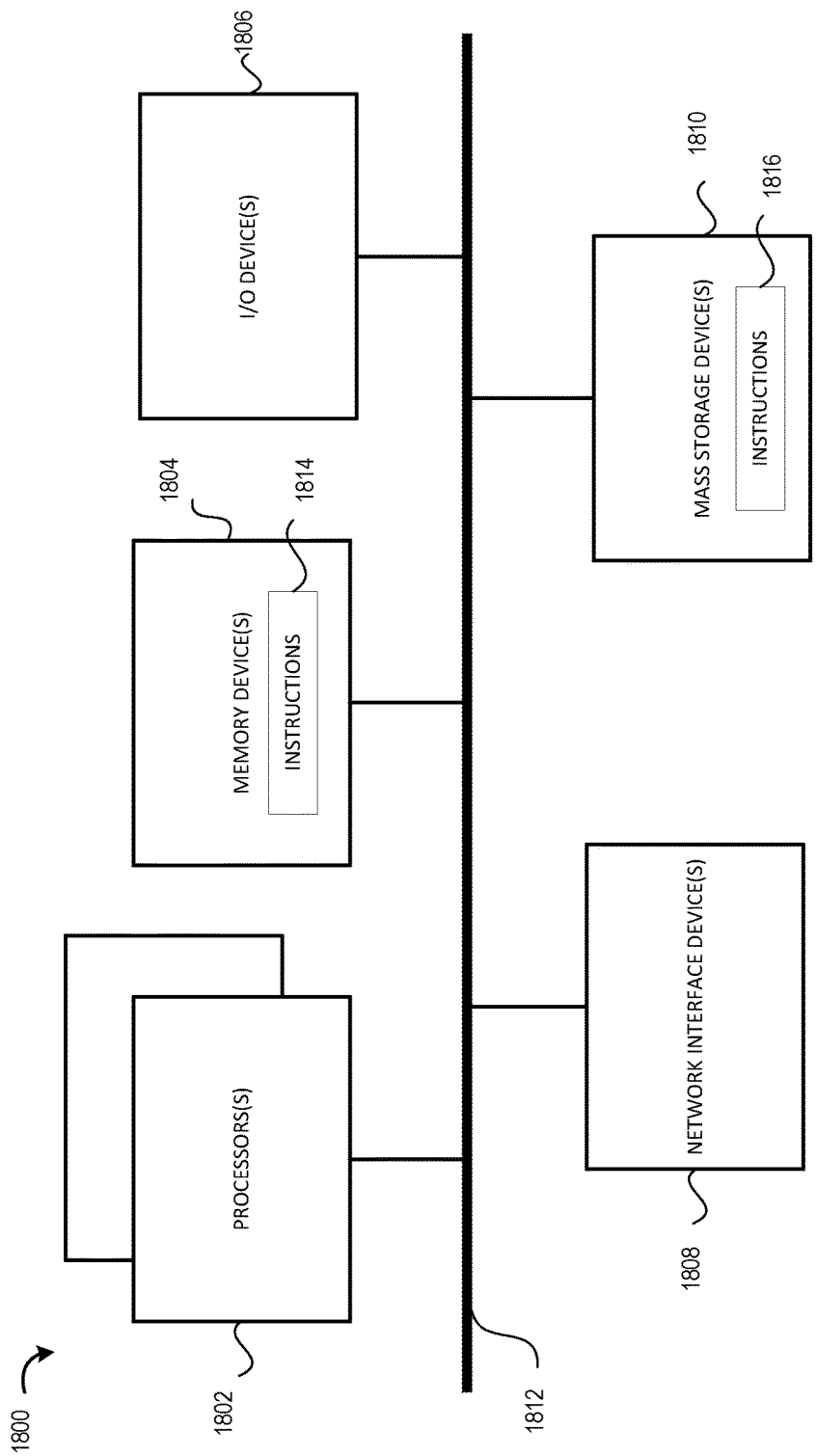
FIG. 18 is a functional block diagram of an example general purpose computer system suitable for use in the disclosed injection training systems and for executing the disclosed methods and computer-readable media for injection training.

FIG. 18 is a functional block diagram of an embodiment of a general purpose computing system suitable for use in implementing the disclosed systems and in executing the disclosed methods and the executable instructions stored on the non-transitory, computer-readable media for injection training in accordance with various embodiments of the present disclosure. By way of illustration, the computing system includes a computing device 1800. The computing device 1800 can take one or more of different forms, including, by way of non-limiting examples, a laptop computer, a stand-alone personal computer, a server, a tablet, a workstation, a handheld device, a mobile device (such as a smartphone), and a consumer electronic device (such as a video game console), to name a few. The computing device 1800 can be a stand-alone device, or it can be configured to be part of a computing network, a computing cluster, a cloud-based computing infrastructure, or the like.

In a basic configuration, the computing device 1800 can include one or more processors 1802 and one or more memory devices 1804. The one or more processors 1802 can be configured to execute instructions and to process data to perform one or more functions, such as the methods and the executable instructions stored on computer-readable media disclosed herein. Illustratively, the one or more processors 1802 may include, without limitation, two or more processing cores on a single processing chip, two or more separate processor chips, or both. In some embodiments, the computing device 1800 can also include one or more additional or specialized processors such as, for example, the sensor processor 252, the syringe processor 254, or a graphics processor (not shown) to perform graphics processing functions that can be diverted from the one or more processors 1802 to improve performance and/or to relieve their workload. The memory 1804 can be arranged in a hierarchy and can include one or more levels of cache. The memory 1804 may include one or more memory devices that store data, including without limitation, volatile memory such as random access memory (RAM), non-volatile memory, such as and read-only memory (ROM), flash memory, etc., or a combination of volatile and non-volatile memory.

The computing device 1800 can also include one or more input and output (I/O) connections, such as USB connections, display ports, proprietary connections, and others to connect to various devices to provide inputs and outputs to the computing device 1800. The I/O device(s) 1806 may include one or more components that allow a user of the computing device 1800 to interface with applications executing in the computing device 1800. For example, the I/O device(s) 1806 may include devices such as a keyboard, a mouse, a touch pad, a touch screen, a microphone, an accelerometer, a camera, or any other user input device configurable to work with the computing device 1800. The I/O device(s) 1806 may also include, for example, a display (e.g., an LCD display, a CRT display, an electronic ink display, or a plasma display, to name a few), a printer, a speaker, or any other output devices configurable to work with the computing device 1800.

The computing device 1800 can also include one or more network interface devices 1808 that allow the computing device 1800 to communicate with other computers and applications. The one or more network interface devices 1808 may include any communication device for sending and receiving data across a network, including but not limited to, a network interface card, a modem, or another network adapter capable of transmitting and receiving data over a network. Communication protocol connections can include, without limitation, an Ethernet interface, a wireless interface, a bus interface, a storage area network interface, and a proprietary interface. Communication connections established via the network interface devices 1808 can be used to connect the computing device 1800 to a computer network. A computer network is a telecommunications network that enables computers, and possibly other devices, to exchange data and share resources along data connections. There are many different types of computing networks that exhibit a variety of characteristics such as topology, connection method, and scale. Examples of computer networks include a local area network, a wide area network, the Internet, or other networks.

The computing device 1800 can also include one or more mass storage devices 1810. The one or more mass storage devices 1810 can be removable or non-removable, and can include, without limitation, a magnetic storage device (e.g., a hard disk), an optical storage medium (e.g., a compact disc (CD) drive or a digital versatile disc (DVD) drive), a high-definition optical storage medium, an electronic storage device (e.g., an erasable programmable read-only memory (EPROM) or a flash drive), solid-state memory, flash storage devices, or other data storage devices known in the art. Computer storage media can include volatile, non-volatile, removable, and non-removable media configured to store information such as, for example, computer-readable instructions, data arrangements, program components, or other information. Illustratively, computer storage media can include, without limitation, random access memory (RAM), read-only memory (ROM), electrically erasable programmable read-only memory (EEPROM), flash memory, solid-state memory, CD-ROM, DVD memory, or other optical storage, magnetic cassettes, magnetic tape, magnetic disk storage or other magnetic storage devices, a universal serial bus (USB) flash drive, a flash memory card, or other flash storage devices, or any other storage medium that may be configured to store computer-readable information and that can be read by the computing device 1800. The one or more memory devices 1804 and the one or more mass storage devices 1810 may be employed to store a working copy and a permanent copy of programming instructions, illustrated as instructions 1814 and 1816, respectively, for implementing various aspects of the embodiments of the present disclosure. The components of the computing device 1800 can be coupled together by way of a bus 1812, which may represent one or more buses.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art may appreciate that the scope of the disclosure is intended to cover any aspect of the novel systems, apparatuses, and methods disclosed herein, whether implemented independently of, or combined with, any other aspect described. For example, an apparatus may be implemented or a method may be practiced using any number of the aspects set forth herein. In addition, the scope of the described features is intended to cover such an apparatus or method which is practiced using other structure, functionality, or structure and functionality in addition to or other than the various aspects disclosed herein. It may be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different injection training technologies, system configurations, networks, and transmission protocols, some of which are illustrated by way of example in the figures and the included description of the preferred aspects. The detailed description and drawings are merely illustrative of the disclosure rather than limiting, the scope of the disclosure being defined by the appended claims and equivalents thereof.

The terms "processor" and "processor module," as used herein are a broad terms, and are to be given their ordinary and customary meaning to a person of ordinary skill in the art (and are not to be limited to a special or customized meaning), and refer without limitation to a computer system, state machine, processor, or the like designed to perform arithmetic or logic operations using logic circuitry that responds to and processes the basic instructions that drive a computer. In some embodiments, the terms can include ROM and/or RAM associated therewith.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "message" encompasses a wide variety of formats for transmitting information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed/transmitted/stored/received/etc. in multiple parts.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such embodiment decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in an electronic device. In the alternative, the processor and the storage medium can reside as discrete components in an electronic device.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. A method to improve performance of an injection technique using one or more signal processors of an injection training system having an anatomically-shaped apparatus and a syringe, the method comprising:
    providing the anatomically-shaped apparatus, the anatomically-shaped apparatus configured to receive a training injection of the injection technique performed by a user;
    providing the syringe having a needle, a barrel, and a plunger and configured to deliver the training injection to the anatomically-shaped apparatus, the syringe further comprising at least one syringe sensor on the syringe;
    receiving, by the one or more signal processors of the injection training system, sensor-based injection information associated with the training injection of the injection technique, the sensor-based injection information comprising information indicative of the position and use characteristics of the syringe detected by the at least one syringe sensor;
    analyzing electronically, using the one or more signal processors, the sensor-based injection information;
    evaluating electronically, using the one or more signal processors, the analyzed sensor-based injection information relative to at least one evaluation criterion; and
    comparing electronically, using the one or more signal processors, the analyzed sensor-based injection information with at least one performance requirement to determine whether the training injection met the at least one performance requirement;
    outputting by the one or more signal processors, for displaying on a display device during and/or after the training injection, a graphical depiction of the training injection, wherein the graphic depiction includes a digital three-dimensional model of the anatomically-shaped apparatus a location of the needle relative to the digital three-dimensional model of the anatomically-shaped apparatus, and a dynamic position of the plunger in real time, the digital three-dimensional model of the anatomically-shaped apparatus comprising facial anatomical features, wherein the one or more signal processors are configured to alter a view of the graphical depiction to better visualize the training injection; and
    outputting electronically, using the one or more signal processors, based on the analyzed sensor-based injection information, a recommended action to improve injection technique.

2. The method of claim 1, wherein the analyzed sensor-based injection information further comprises:
    a target location for the training injection;
    a location on the anatomically-shaped apparatus where the training injection was delivered;
    a determination of whether the training injection was delivered to the target location;
    a depth of the training injection;
    an amount of therapeutic agent delivered by the training injection;
    a duration of the training injection;
    an angle of entry of the training injection;
    a determination as to whether the training injection passed or failed an injection test;
    a score;
    an accuracy rating;
    an overall rating; and
    an average score for the training injection performed when performed more than once.

3. The method of claim 1, wherein analyzing the sensor-based injection information comprises obtaining sensor-based injection information associated with a previous training injection of the injection technique and comparing the sensor-based injection information associated with the previous training injection to the sensor-based injection information associated with the training injection.

4. The method of claim 1, wherein analyzing the sensor-based injection information comprises:
    obtaining aggregated sensor-based injection information associated with a plurality of previous training injections of the injection technique; and
    comparing the aggregated sensor-based injection information with the injection information associated with the training injection.

5. The method of claim 1, the recommended action to improve injection technique comprises identifying training resources directed at an aspect of the injection technique.

6. A method to analyze a collection of injection training data using one or more signal processors of an injection training system having an anatomically-shaped apparatus and a syringe, the method comprising:
    providing the anatomically-shaped apparatus, the anatomically-shaped apparatus configured to receive a training injection of the injection technique performed by a user;

providing the syringe having a needle, a barrel, and a plunger and configured to deliver the training injection to the anatomically-shaped apparatus, the syringe further comprising at least one syringe sensor on the syringe;

receiving, by the one or more signal processors of the injection training system, the collection of injection training data, the collection of injection training data comprising information sets, wherein an information set comprises data collected during the injection training from the at least one syringe sensor, the information set comprising:
  information describing dynamic motion of the syringe relative to the anatomically-shaped apparatus as the syringe delivers the training injection to the anatomically-shaped apparatus;
  information describing the anatomically-shaped apparatus; and
  information describing the training injection;

converting, using the one or more signal processors of the injection training system, the collection of injection training data by grouping various types of data into a same format and assigning a label indicating a category of item contents, such that the converted collection of injection training data is in condition for training injection performance analysis;

generating, using the one or more signal processors of the injection training system, an aggregate assessment of injection training performance; and outputting from the one or more signal processors, for displaying on a display device during and/or after the training injection, a graphical depiction of the training injection, wherein the graphic depiction includes a digital three-dimensional model of the anatomically-shaped apparatus, a digital three-dimensional model of the syringe, a dynamic position of the plunger in real time, and a location of the needle relative to the digital three-dimensional model of the anatomically-shaped apparatus, the digital three-dimensional model of the anatomically-shaped apparatus comprising a plurality of anatomical layers;

wherein the one or more signal processors are configured to alter a view of the graphical depiction to better visualize the training injection.

7. The method of claim 6, wherein the information describing dynamic motion of the syringe as the syringe delivers the training injection to the anatomically-shaped apparatus comprises a measure of force provided by a force sensor corresponds to a force applied to the plunger of the syringe.

8. The method of claim 7, wherein measured force applied to the plunger of the syringe is processed to determine an estimate of an amount of therapeutic agent delivered or simulated to have been delivered by the training injection.

9. The method of claim 6, wherein the information describing dynamic motion of the syringe as the syringe delivers the training injection to the anatomically-shaped apparatus is measured at least in part by an inertial measurement unit.

10. The method of claim 6, wherein the information describing dynamic motion of the syringe as the syringe delivers the training injection to the anatomically-shaped apparatus comprises at least one of:
  an angle of approach of the needle relative to the anatomically-shaped apparatus;
  an angle of entry of the needle into the anatomically-shaped apparatus;
  a depth of penetration of the needle within the anatomically-shaped apparatus;
  an amount of force applied by the syringe to the anatomically-shaped apparatus;
  an amount of therapeutic agent delivered to the anatomically-shaped apparatus;
  an estimated amount of therapeutic agent simulated to have been delivered to the anatomically-shaped apparatus;
  an amount of force applied to the plunger during the training injection;
  a rate of flow of therapeutic agent delivered to the anatomically-shaped apparatus;
  an estimated rate of flow of therapeutic agent simulated to have been delivered to the anatomically-shaped apparatus;
  a proximity of delivered injection relative to a target injection site; or
  an identification of an anatomical structure affected by the training injection.

11. The method of claim 6, wherein the digital three-dimensional model of the anatomically-shaped apparatus is based on information corresponding to facial anatomical structure represented by the anatomically-shaped apparatus, the plurality of anatomical layers of the digital three-dimensional model comprising:
  a skin layer;
  a transparent skin layer;
  a muscle layer;
  a fat pad layer;
  a nerve layer;
  a blood vessel layer; and
  a bone layer.

12. The method of claim 6, wherein the information describing the training session comprises:
  a training date and time;
  a training location;
  a trainee identity;
  a training session duration;
  a training score;
  an injection time; and
  a pass/fail determination.

13. The method of claim 6, wherein the generated aggregate assessment comprises at least one of:
  a ranking of injection performances reflected in the collection of injection training data;
  a percentage comparison of a quantity of training injections performed by a first trainee relative to a quantity of training injections performed by all trainees represented in the collection of injection training data;
  a comparison of a training injection performed by the first trainee relative to a group of trainees who have performed the same injection training; and
  a comparison of training injections performed by all trainees represented in the collection of injection training data relative to a training injection performed by an expert in the field.

14. The method of claim 6, wherein the generated aggregate assessment comprises a ranking of injection performances within a subgroup of injection performances reflected in the collection of injection training data, wherein the subgroup comprises information sets corresponding to an injection training session performed in a country, a region, a city, or a practice group.

15. The method of claim 6, wherein the training injection comprises simulating delivery of an amount of therapeutic agent to the anatomically-shaped apparatus using the syringe.

16. The method of claim 6, wherein altering the view of the training injection comprises altering a viewing angle of the graphical depiction by rotating the view.

17. The method of claim 6, wherein altering the view of the training injection comprises causing to be displayed different ones of the plurality of anatomical layers as a needle tip of the syringe penetrates each one of the plurality of anatomical layers.

18. The method of claim 6, wherein altering the view of the training injection comprises causing one or more of the plurality of anatomical layers to be hidden from the view.

19. The method of claim 1, wherein altering the view of the training injection comprises altering a viewing angle of the graphical depiction by rotating the view.

20. The method of claim 1, wherein altering the view of the training injection comprises causing to be displayed different ones of a plurality of anatomical layers of the anatomically-shaped apparatus as a needle tip of the syringe penetrates each one of the plurality of anatomical layers, the plurality of anatomical layers comprising a skin layer, a muscle layer, a nerve layer, and a blood vessel layer.

21. The method of claim 1, wherein altering the view of the training injection comprises causing one or more of a plurality of anatomical layers of the anatomically-shaped apparatus to be hidden from the view, the plurality of anatomical layers comprising a skin layer, a muscle layer, a nerve layer, and a blood vessel layer.

22. The method of claim 1, wherein the training injection comprises simulating delivery of an amount of therapeutic agent to the anatomically-shaped apparatus using the syringe.

23. The method of claim 1, wherein the graphical depiction further comprises a simulated delivery of therapeutic agent to the digital three-dimensional model of the anatomically-shaped apparatus.

24. The method of claim 6, wherein the graphical depiction further comprises a simulated delivery of therapeutic agent to the digital three-dimensional model of the anatomically-shaped apparatus.

* * * * *

(12) INTER PARTES REVIEW CERTIFICATE (2625th)

United States Patent
Rios et al.

(10) Number: US 10,290,231 K1
(45) Certificate Issued: Feb. 25, 2022

(54) AUTOMATED DETECTION OF PERFORMANCE CHARACTERISTICS IN AN INJECTION TRAINING SYSTEM

(71) Applicants: Gabrielle A. Rios; David J. Mishelevich; Clark B. Foster

(72) Inventors: Gabrielle A. Rios; David J. Mishelevich; Clark B. Foster

(73) Assignee: TRUINJECT CORP.

Trial Number:

IPR2020-00935 filed May 13, 2020

Inter Partes Review Certificate for:

Patent No.: 10,290,231
Issued: May 14, 2019
Appl. No.: 14/645,997
Filed: Mar. 12, 2015

The results of IPR2020-00935 are reflected in this inter partes review certificate under 35 U.S.C. 318(b).

INTER PARTES REVIEW CERTIFICATE
U.S. Patent 10,290,231 K1
Trial No. IPR2020-00935
Certificate Issued Feb. 25, 2022

AS A RESULT OF THE INTER PARTES REVIEW PROCEEDING, IT HAS BEEN DETERMINED THAT:

Claims 1, 3, 4, 6, 10-12, 15-19 and 21-24 are cancelled.

* * * * *